United States Patent
Kumita et al.

(10) Patent No.: US 6,356,515 B1
(45) Date of Patent: Mar. 12, 2002

(54) HIGH POWER CONTROLLING SYSTEM FOR MAGNETO-OPTICAL STORAGE SYSTEM

(75) Inventors: Hiroshi Kumita, Nagano; Shigenori Yanagi; Yoshiyuki Nanba, both of Kawasaki, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/427,899

(22) Filed: Oct. 27, 1999

(30) Foreign Application Priority Data

Oct. 27, 1998 (JP) .......................... 10-305948
Aug. 11, 1999 (JP) .......................... 11-227651

(51) Int. Cl.[7] .............................. G11B 11/00
(52) U.S. Cl. ........................ 369/13; 369/116
(58) Field of Search .................. 369/13, 14, 116; 300/59, 114; 428/694 ML

(56) References Cited

U.S. PATENT DOCUMENTS

| | | | | |
|---|---|---|---|---|
| 5,684,765 A | * | 11/1997 | Matsumoto et al. | 369/13 |
| 5,703,841 A | * | 12/1997 | Hiroki | 369/13 |
| 5,808,972 A | * | 9/1998 | Matsumoto et al. | 369/13 |
| 5,825,724 A | * | 10/1998 | Matsumoto et al. | 369/13 |
| 5,831,943 A | * | 11/1998 | Kurita et al. | 369/13 |
| 5,862,103 A | * | 1/1999 | Matsumoto et al. | 369/13 |
| 5,982,714 A | * | 11/1999 | Koda | 369/13 |
| 6,125,084 A | * | 9/2000 | Sukeda et al. | 369/13 |

FOREIGN PATENT DOCUMENTS

| | | | | |
|---|---|---|---|---|
| JP | 6-203418 | * | 7/1994 | 369/13 |
| JP | 7176094 | | 7/1995 | |

* cited by examiner

*Primary Examiner*—Tan Dinh
(74) *Attorney, Agent, or Firm*—Greer, Burns & Crain, Ltd.

(57) ABSTRACT

An optical storage medium processing method where a high power process is conducted upon the power adjusting area of the optical storage medium (which is used to perform optical beam power adjustment) by repeatedly conducting information recording by repeatedly radiating the optical beam at a power that is higher than that used for normal recording or erasing operations. The present invention enables highly reliable high density recording through accurate control of the laser power during the recording operation, in each area of the optical storage medium, regardless of the frequency of write and erase operations performed on each area.

22 Claims, 17 Drawing Sheets

BLOCK DIAGRAM OF THE OPTICAL DISK DRIVE OF THE
PRESENT INVENTION

EXPLANATORY DIAGRAM OF THE INTERNAL STRUCTURE
OF THE APPARATUS WHEN LOADING AN MO CARTRIDGE

EXPLANATORY DIAGRAM OF RECORDING LASER POWER STORING TABLE OF FIG. 6

| ZONE NO. i | RECORDING LASER POWER |
|---|---|
| 1 | Pz 1 |
| 2 | Pz 2 |
| 3 | Pz 3 |
| 4 | Pz 4 |
| 5 | Pz 5 |
| 6 | Pz 6 |
| 7 | Pz 7 |
| 8 | Pz 8 |
| 9 | Pz 9 |
| 10 | Pz 10 |
| 11 | Pz 11 |

FIG. 7

CHARACTERISTIC DIAGRAM OF MISMATCHING NUMBER (RECORDING CONDITION)
FOR CHANGES OF RECORDING LASER POWER IN THE RECORDING LASER
POWER CALIBRATION PROCESS OF FIG. 6

EXPLANATORY DIAGRAM OF LINEAR INTERPOLATION BY
RECORDING LASER POWER SETTING MEANS OF FIG. 6

EXPLANATORY DIAGRAM OF TEMPERATURE COMPENSATING
COEFFICIENT BY RECORDING LASER POWER SETTING MEANS OF FIG. 6

EXPLANATORY DIAGRAM OF THE REPRODUCTION
CONFIRMING TABLE OF FIG. 14

| MEASURING NO. | RECORDING LASER POWER | MISMATCHING NO. |
|---|---|---|
| 1 | P 1 | Er 1 |
| 2 | P 2 | Er 2 |
| 3 | P 3 | Er 3 |
| 4 | P 4 | Er 4 |
| 5 | P 5 | Er 5 |
| 6 | P 6 | Er 6 |
| 7 | P 7 | Er 7 |
| 8 | P 8 | Er 8 |
| 9 | P 9 | Er 9 |
| 10 | P 10 | Er 10 |
| 11 | P 11 | Er 11 |

FIG. 15

EXPLANATORY DIAGRAM OF
OPTICAL STORAGE MEDIUM

EXPLANATORY DIAGRAM OF RAD SYSTEM
REPRODUCING OPERATION

HIGH POWER CONTROLLING SYSTEM FOR MAGNETO-OPTICAL STORAGE SYSTEM

BACKGROUND OF THE INVENTION

The present invention relates to an optical storage medium for recording and reproducing information using a laser beam and an optical storage apparatus.

Recently, attention is being paid to disk and card/tape types of optical storage media, such as phase changing and magneto-optical type media. Particularly, there is an interest in optical disks with higher recording capacities than the currently available floppy disks, and in hard disks using recording pits of the sub-micron order positioned on the medium. Such magneto-optical disks utilize rare earth-transition metal based materials, and can be rewritten a hundred thousand times, or more. Therefore, there is an interest in further development of such magneto-optical disks.

A 3.5 inch optical disk with a recording capacity of either 540 MB or 640 MB on only one side has recently been developed. For comparison purposes, the recording capacity of one side of a conventional 3.5 inch floppy disk is about 1 MB. Thus, one side of an optical disk has the recording capacity equal to that of 540 or 640 floppy disks. Accordingly, it goes without saying that an optical disk is a rewritable storage medium having a very high recording density.

However, even such high recording densities must further be increased in order to satisfy the requirements of the multimedia era, both now and in future. Therefore, a larger number of marks should be recorded on the medium in order to increase the recording density. For this purpose, the marks currently used should be reduced in size, and the interval between marks should also be decreased.

When attempting to raise the recording density with the method explained above, one option is to attempt to shorten the wavelength of the laser beam from its current value of 685 nm. However, there is another option in which the pit size is reduced, while still maintaining the current wavelength of 685 nm. Under this option, it is possible during recording to form marks which are smaller than the beam diameter by controlling the power of laser beam. But, during reproducing, when a mark smaller than the beam diameter is reproduced, crosstalk to the neighboring marks increases. In the worst case, the neighboring mark is included within the reproducing beam. Practically speaking, it is very difficult to overcome this crosstalk problem under normal use conditions.

However, two methods of reproducing marks which are smaller than the beam diameter in the current wavelength of 685 nm are two different types of magnetically induced super-resolution (MSR) techniques which can be classified as a FAD (front aperture detection) system and a RAD (rear aperture detection) system.

More particularly, in the RAD system, an initialization is performed, as shown in FIG. 17(B), using an initializing magnet 232 to set the magnetizing direction of the reproducing layer 216 to a constant direction. The reading operation is conducted with a reproducing laser (whose power is slightly increased during this operation), a mask 236 (for allowing the initial magnetizing information of the reproducing layer 216 to be retained) and an aperture 238 (for allowing the heat of the laser spot 234 to transfer the magnetizing information of the recording layer 220 to the reproducing layer 216 after erasing the initial magnetizing information). The mask 236 and the aperture 238 result from the temperature distribution of the spot 234. The magnetizing information of the recording layer 220 transferred to the reproducing layer 216 is converted to an optical signal by means of the magneto-optical effect (e.g., the Kerr effect or the Faraday effect) for data reproduction.

In this case, although the mark 228 of the track 214 currently being read by the laser beam has been transferred to the reproducing layer 216, the mark 230 intended to be read next is not transferred due to the formation of the mask 236. Thus, even when the recording mark is smaller than the laser spot 234, crosstalk is not generated, and marks smaller than the beam diameter can be reproduced. Moreover, when this magnetically induced super resolution technique is used, since the area outside of the reproducing area of the recording layer 220 is masked by the initialized reproducing layer 216, mark interference from neighboring marks is not generated, and the mark interval can be reduced. Accordingly, since crosstalk from the neighboring tracks can also be suppressed, the track pitch can also be reduced, and high density recording/reproducing can be obtained even when using the current wavelength of 685 nm.

Japanese Published Unexamined Patent Application Nos. HEI 7-244877, HEI 9-147436 and HEI 10-134429 disclose some of the details of the principles of magnetically induced super resolution techniques, examples of rare earth-transition metal based film material of magneto-optical recording medium layers consisting of a reproducing layer, a switch layer (an intermediate layer) and a recording layer; and examples of magneto-optical storage medium manufacturing methods.

However, optical memory devices for driving optical storage mediums for high density recording have a problem in that adequate recording operations cannot be realized if the laser power for the recording operation is not strictly controlled.

Moreover, another problem that has also been found is that the sensitivity of the storage medium changes depending on the number of write and erase operations performed, which results in imperfect control of the laser power during recording, which thereby increases the rate of recording errors.

The present invention has been proposed, considering the problems of the related art explained above, and it is therefore an object of the present invention to provide an optical storage medium, a method of processing that medium, and an optical storage medium processing apparatus which enables highly reliable high density recording by strictly controlling the laser power of the recording operation in each area of an optical storage medium that is not effected by the number of write and erase operations.

The present invention is characterized in that a high power process is repeatedly performed upon an optical storage medium. In this high power process, the power of the optical beam is increased to a higher power than that used for recording or erasing, and the beam is radiated upon a power adjusting area of the optical storage medium. This power adjusting area is used, at least in part, to adjust the power of the optical beam.

Moreover, the present invention also relates to an optical storage medium processing apparatus for accessing an optical storage medium by radiating thereto an optical beam. This apparatus includes an optical head for radiating an optical beam of a predetermined power to a predetermined position of the optical storage medium; and a high power process controller for positioning the optical head to direct the optical beam to a power adjusting area. The high power process controller is also used for controlling the power of the optical beam to be a power that is higher than that used for recording or erasing, to thereby control a high power process in which the high power optical beam is radiated upon the power adjusting area.

With the present invention, the sensitivity characteristic of the power adjusting area of the medium at its initial condition (i.e., during the period immediately after the manufacture of the optical storage medium) may be changed to a sensitivity characteristic of a saturated condition after repetition of write and erase operations a plurality of times. Namely, in this saturated condition, even after the write and erase operations are repeated, sensitivity shifts (i.e., variations of the optimum recording power) do not occur, and the optimum recording power for the medium can precisely be controlled.

Naturally, it is better to conduct the high power process upon the entire medium, but processing times as long as several thousand minutes may be required for performing high power processing upon the entire medium. Therefore, in the present invention, high power processing is performed only to the power adjusting area. Because the power adjusting area is used to adjust the power of the optical beam power, and because the present invention eliminates sensitivity shifts, precise control of the optical power can be obtained.

Moreover, when the medium substrate is formed of a resin such as polycarbonate, if the medium as a whole (or if all of the tracks) are heated for a long period of time, cracks may be generated, and these cracks disable successive use of the medium. However, the present invention provides that generation of cracks can be prevented by performing the high power process only to the necessary area.

The present apparatus is also characterized in that the optical beam is radiated at a higher power than ordinary power, and simultaneously a magnetic field of a predetermined direction is also applied to the medium. This predetermined direction of the magnetic field is identical to the erasing direction. Thus, in the present invention, high power erasing is performed by radiating the optical beam upon the optical storage medium in the high power while applying thereto a magnetic field in the erasing direction.

Therefore, since the magneto-optical medium is heated with an optical beam while a magnetic field is being applied thereto, the magnetic condition of the magnetic film of the medium is changed to the recording or the erasing condition, and when such changes are repeated multiple times, the magnetizing condition can then be shifted to the saturated condition.

In addition, the present invention is also characterized in that the high power process can be performed during the process of certifying the optical storage medium. The optical storage medium is certified, to initially write the information, by detecting defects of medium, and then by writing defect list information (PDL) to the medium. At the time of performing this process, when the high power process is performed, such a write process is conducted with precise control of the optimum recording power, and thereby highly reliable recording can be realized.

In addition, the present invention is also characterized in that the rotational frequency of the optical storage medium may be set, while conducting the high power process, to a value that is lower than the usual rotational frequency. Therefore, the period of time that each section of the medium is heated by the beam is increased, and the beam power does not need to be raised as high. When the desired medium heating temperature (which is a temperature higher than the Curie point of the recording layer) is attained, the beam power may be then set to be identical to that used for ordinary recording and erasing, depending on rotational frequency.

The present invention is also characterized in that the off-track detecting function is at least partially disabled during the high power process. Therefore, the accuracy for detecting off-track errors during the high power process is lowered to prevent interruptions in the process due to minute errors, and to shorten the processing time, because detecting accuracy is not critical during this period since user data is not being recorded to the data area.

The present invention also relates to an optical storage medium processing method that includes the steps of radiating an optical beam upon an optical medium at a power that is higher than the power used for recording or erasing; and repeatedly impressing a high power magnetic field upon the medium in order to impress the magnetic field of the medium into a predetermined direction.

Therefore, the sensitivity characteristic of the medium in its initial condition (immediately after its manufacture) can be changed to that of a saturated condition after the write and erase operations are repeated for a plural number of times. Particularly, since the medium is heated with an optical beam while a magnetic field is being applied thereto, the magnetic condition of magnetic film of the medium can be changed to the recording or the erasing condition, and if such changes are repeated enough, the magnetizing condition can surely be shifted to a saturated condition.

The high power process of the present invention may be executed to all tracks of the medium, or it may be executed only to areas that are assured of a higher recording frequency, such as the power adjusting area or the like.

The optical storage medium processing apparatus of the present invention may also be characterized by a power adjustment processor for determining a preliminary optimum recording power to be used for determining an appropriate power for recording information to an information recording area of the optical storage medium, where this determination is made by recording to a power adjusting area of the optical storage medium prior to recording said information, and wherein the power adjusting area has undergone a high power process; and a power processor for obtaining the optimum recording power for the recording of information to the information recording area, where the optimum recording power is attained by compensating the preliminary optimum recording power obtained by the power adjustment processor with a predetermined amount of sensitivity compensation.

Therefore, the optimum recording power of the information recording area can be obtained, and highly reliable recording can also be realized by compensating the preliminary optimum recording power obtained by the test write for power adjustment upon the storage medium to which the high power process has been conducted in the power adjusting area (test area), with the sensitivity compensation amount determined depending upon the medium sensitivity characteristic and the temperature characteristic of the information recording area.

In addition, the sensitivity compensation amount can be determined so that the sensitivity shift is within the range of the optimum recording power in the saturated condition, and so that it is also within the range of the optimum recording power in the initial condition, with the power satisfying the predetermined conditions becoming identical to the optimum recording power in the information recording area.

Since high power processing is performed to the power adjusting area, the sensitivity shift of such area is saturated. The information recording area changes its sensitivity shift from the initial condition to the saturated condition depending on its application frequency, and the optimum recording power also fluctuates during this change in conditions. Therefore, in the present invention, the optimum recording power of the information recording area is determined so that sufficient power is obtained for both types of areas, i.e., areas where the sensitivity shift is in the initial condition and areas where it is in the saturated condition.

Because the optimum recording power under the initial condition and the saturated condition are measured respectively, thereby any deviation from the optimum recording power of the power adjusting area can be obtained. This deviation is predetermined as the sensitivity compensation amount. Therefore, the optimum power of the information recording area can easily be obtained by only conducting a write test.

Moreover, it is also possible to change the sensitivity compensation amount depending upon the environmental temperature in order to precisely control the sensitivity compensation amount. In addition, it is also possible to change the sensitivity compensation amount for each zone of the optical storage medium. Moreover, for this purpose, the sensitivity compensation amount can be also changed by adding or subtracting a constant amount during the rewriting operation when a recording error is generated.

The present invention also relates to an optical storage medium capable of having information repeatedly recorded thereon by receiving radiation from an optical beam, where that medium includes a plurality of zones dividing the medium, wherein each zone has a Curie point, and a heating process area in each of the zones, wherein a heating process conducted at a temperature that is higher than the Curie point of the associated zone has been performed upon each heating process area. Each zone is formed of a plurality of areas which are divided, for access management, in the radius direction of the optical storage medium, and are provided for control of zone CAV and zone CLV.

In addition, it is also a characteristic of the present invention that a control area is provided in the optical storage medium to record information indicating that the high power process has been conducted. Therefore, the high power process will not be unnecessarily performed over and over again.

BRIEF DESCRIPTION OF THE DRAWINGS

Preferred embodiments of the present invention are described herein with reference to the drawings wherein:

FIG. 7 is an explanatory diagram of the recording laser power storing table;

FIG. 15 is an explanatory diagram of the reproduction confirming table of FIG. 14;

DESCRIPTION OF THE PREFERRED EMBODIMENT

Figure 1:
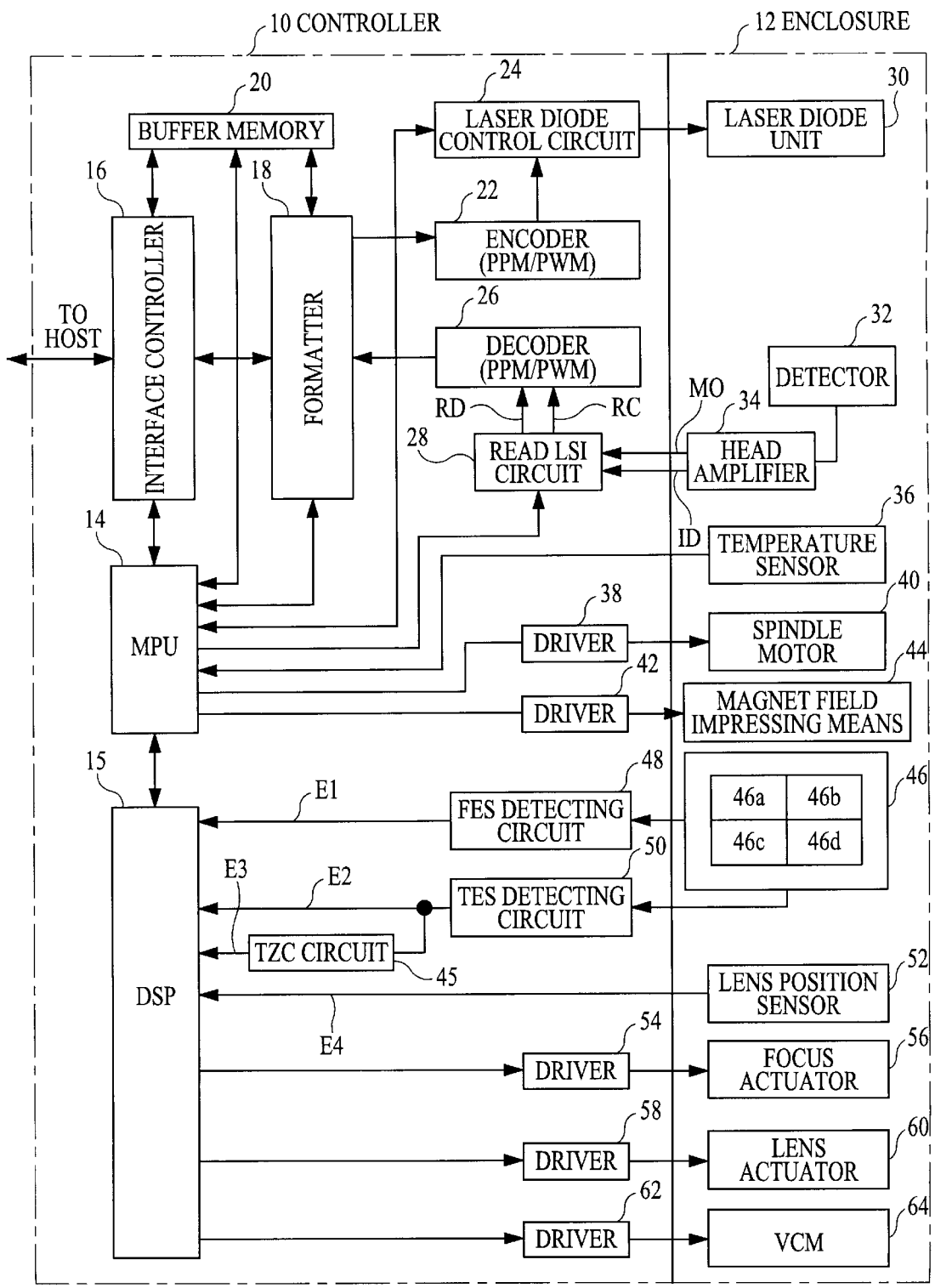
FIG. 1 is a block diagram of an optical disk drive of the present invention.

FIG. 1 is a circuit block diagram of an optical disk drive used as the optical storage apparatus of the present invention. The optical disk drive of the present invention is primarily composed of a controller 10 and an enclosure 12. The controller 10 is provided with an MPU 14 for performing total control of the optical disk drive; an interface controller 16 for exchanging commands and data with a host apparatus; a formatter 18 for executing the format process of writing data to the optical disk medium and for also executing an ECC process for the read data. The MPU 14 and a buffer memory 20 are used in common by the interface controller 16 and the formatter 18.

An encoder 22 and a laser diode control circuit 24 are provided as the write system for the formatter 18. The control output of the laser diode control circuit 24 is given to the laser diode unit 30 provided on the optical unit within the enclosure 12. The laser diode unit 30 is integrally provided with a laser diode and a photosensitive element that is used for monitoring.

In this embodiment, either the magneto-optical recording medium of a FAD system (hereinafter referred to as FAD medium) or the magneto-optical recording medium of a RAD system (hereinafter referred to as a RAD medium) with the high recording density of the super resolution system can be used through the medium exchange, in addition to using magneto-optical storage mediums of 128 to 640 MB which are currently available on the market. Examples of systems for recording on the medium include pit position recording (PPM recording), in which data recording depends on marks on the medium, and pulse width recording (PWM recording) in which the edges, namely the front edge and the rear edge of the mark, are set to correspond to data. Moreover, the recording format of medium is set to a ZCAV format (constant angular velocity of zone) in which the medium is divided into a plurality of zones.

When an MO cartridge is loaded into the optical disk drive, the ID portion of the medium is read first, and an MPV 14 recognizes the type of medium from its emboss pit interval. The formatter 18 is then notified of what type of medium has been inserted so that the formatter can perform the format process that corresponds to the medium's capacity and to the type of recording, such as PPM recording or PWM recording.

As the read system for the formatter 18, a decoder 26 and a read LSI circuit 28 are provided. A receiving signal of the beam returning from the laser diode 30 through the detector 32 provided within the enclosure 12 is input into the read LSI circuit 28 as the ID signal and the MO signal via the head amplifier 34. The read LSI circuit 28 is provided with circuit functions such as an AGC circuit, a filter, a sector mark detecting circuit, a synthesizer and a PLL, etc. The read clock and the read data are generated from a combination of the input ID signal and the MO signal. The read clock and the read data are then output to the decoder 26. When zone CAV is used as the medium recording system, the clock frequency corresponding to a zone is controlled to be switched for the comprised synthesizer by MPU 14 for the read LSI circuit 28.

Here, the modulating system of the encoder 22 and the demodulating system of the decoder 26 are switched for modulation and demodulation between either PPM recording or PWM recording, depending upon which type of formatting process has been performed by the formatter 18. A detection signal from the temperature sensor 36 (which is provided within the enclosure 12) is given to the MPU14. The MPU14 controls, to the respective optimum values, the light emitting power for the read operation, the write operation and the erase operation in the laser diode control circuit 24 based upon the temperature of the environment within the apparatus, as detected by the temperature sensor 36. The MPU14 controls the spindle motor 40 provided within the enclosure 12 with a driver 38.

Since the preferred recording format of an MO cartridge is ZCAV, the spindle motor 40 is rotated at a constant speed, for example, 3214 rpm, 3500 rpm, 4200 rpm or 3500 rpm, etc., where the speed is determined depending upon the kind or the capacity of the medium.

The MPU14 controls a magnetic field impressing means 44 (which is provided within the enclosure 12) via the driver 42. The magnetic field impressing means 44 is arranged on the opposite side of the beam radiating side of the MO cartridge that has been loaded into the apparatus. This magnetic field impressing means 44 supplies an external magnetic field to the medium during the recording operation, the erasing operation and the reproducing operation. An electro-magnet is usually used as the magnetic field impressing means 44, but this electro-magnet may be replaced with a permanent magnet, which assures use of the optimum magnetic field as determined by the calibrating process. Alternatively, the magnetic field impressing means 44 may also consist of a combination of an electromagnet and a permanent magnet.

The external magnetic field generated by the magnetic field impressing means 44 during the reproducing operation is the reproducing magnetic field Hr for a FAD medium and the initializing magnetic field Hi for a RAD medium. One important feature of the present invention is that the external magnetic field generated during the reproducing operation by the magnetic field impressing means 44 is always calibrated to its optimum value by the reproducing magnetic field calibrating means, which is a part of the processing function of the MPU14.

The DSP15 functions as a servo controller for positioning the beam emitted from the laser diode 30. A 4-split detector 46 for receiving the beam returning from the medium is provided as an optical unit within the enclosure 12. An FES detecting circuit 48 (focus error signal detecting circuit) generates a focus error signal E1 from the output received from the 4-split detector 46, and it then inputs this signal to the DSP15. When the signals received from the receiving means 46a, 46b, 46c, and 46d of the 4-split detector 46 are defined as Ea, Eb, Ec, and Ed, the focus error signal E1 is detected via the following equation:

$$E1=(Ea+Ec)-(Eb+Ed).$$

This focus error signal E1 is given to the DSP15, and feedback control of the focus actuator 56, which minimizes the focus error signal E1, is performed in the automatic focus control means, which is part of the DSP15. The automatic focus control means obtains the offset value (i.e., a target value), which becomes the optimum focus point, while sequentially changing the position of the objective lens when the control loop is turned OFF, and sets the offset value of this optimum focus point to the automatic focus control loop. Thereby, feedback control is performed to minimize the focus error signal E1 by referencing the position (i.e., the optimum focus point) of the objective lens as determined by the offset value. There are three lens positions that are used in determining the position of the offset value for giving the optimum focus point. The first of these three lens positions gives the maximum tracking error signal E2, the second gives the maximum RF reproducing signal, and the third gives the maximum total signal of the 4-split detector 46.

The TES detecting circuit 50 (i.e., the tracking error signal detecting circuit) generates a tracking error signal E2 from the output received from the 4-split detector 46, and then inputs this signal into the DSP15. Namely, the tracking error signal E2 is expressed as follows (where the signals received from the receiving means 46a, 46b, 46c, and 46d of the 4-split detector 6 are defined as Ea, Eb, Ec, and Ed):

$$E2=(Ea+Eb)-(Ec+Ed)$$

The tracking error signal E2 is input to the TZC circuit 45 (the track zero-cross detecting circuit) to generate the track zero-cross pulse E3. This signal is then input to the DSP15. A lens position sensor 52 for detecting the lens position of the objective lens (which radiates the laser beam to the medium) is provided within the enclosure 12. A lens position detecting signal E4 detected by the lens position sensor (LPOS) 52 is then input to the DSP15. The DSP15 controls the driving of the focus actuator 56, the lens actuator 60 and the VCM64 via the drivers 54, 58, and 62.

Figure 2:
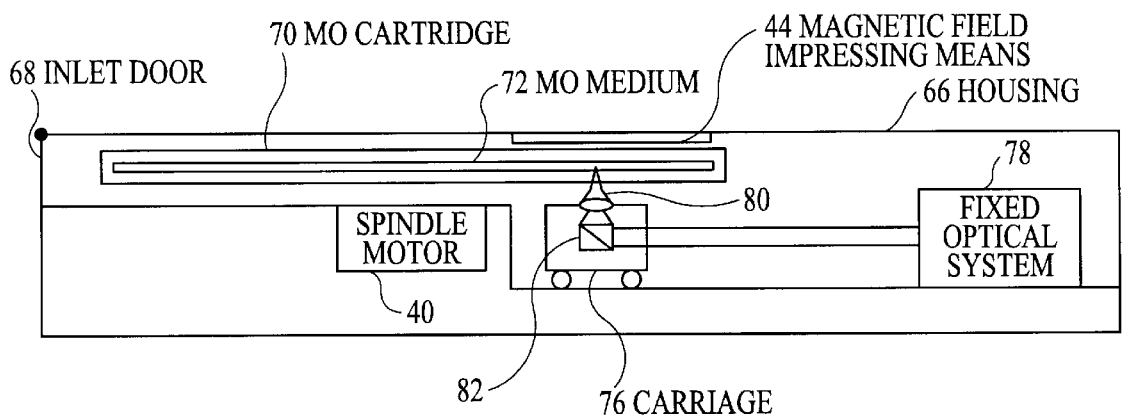
FIG. 2 is an explanatory diagram of the internal structure of an apparatus to which an MO cartridge is loaded.

The enclosure of the optical disk drive is schematically shown in FIG. 2. In FIG. 2, a spindle motor 40 is provided within the housing 66, and the internal MO medium 72 can be loaded onto the rotating shaft of the spindle motor 40 by inserting the MO cartridge 70 through the inlet door 68 and moving it toward the hub of the rotating shaft of the spindle motor 40. Underneath the MO medium 72 of the loaded MO cartridge 70 is a carriage 76, which can freely move (via the VCM 64) to cross the tracks of the medium.

An objective lens 80 is mounted on the carriage 76. Thereby, the beam from a semiconductor laser provided in a fixed optical system 78 is input via a prism 82, which focuses the beam spot on the medium surface of the MO medium 72. Movement of the objective lens 80 in the optical axis direction is controlled by the focus actuator 56 shown in the enclosure 12 of FIG. 1. The objective lens 80 is also moved, for example, within the range of several tens of tracks in the radius direction (i.e., to cross the tracks of the medium) by the lens actuator 60.

The position of the objective lens 80 loaded within the carriage 76 is detected by the lens position sensor 52 of FIG. 1. The lens position sensor 52 initializes the lens position detecting signal to 0 at the neutral position where the optical axis of the objective lens 80 is directed upwardly at a right angle. The lens position sensor 52 then outputs this lens position detecting signal E4. The polarity of this signal depends on whether movement to the outer side or the inner side is required.

A magnetic field impressing means 44 (that extends generally in the radial direction of the MO medium) is arranged to oppose the beam radiating surface of the MO medium 72. Instead of using a magnetic field impressing means that is attached to the housing, other types of magnetic field impressing units may also be used, such as units that are configured to be arranged upon the carriage.

Figure 18:
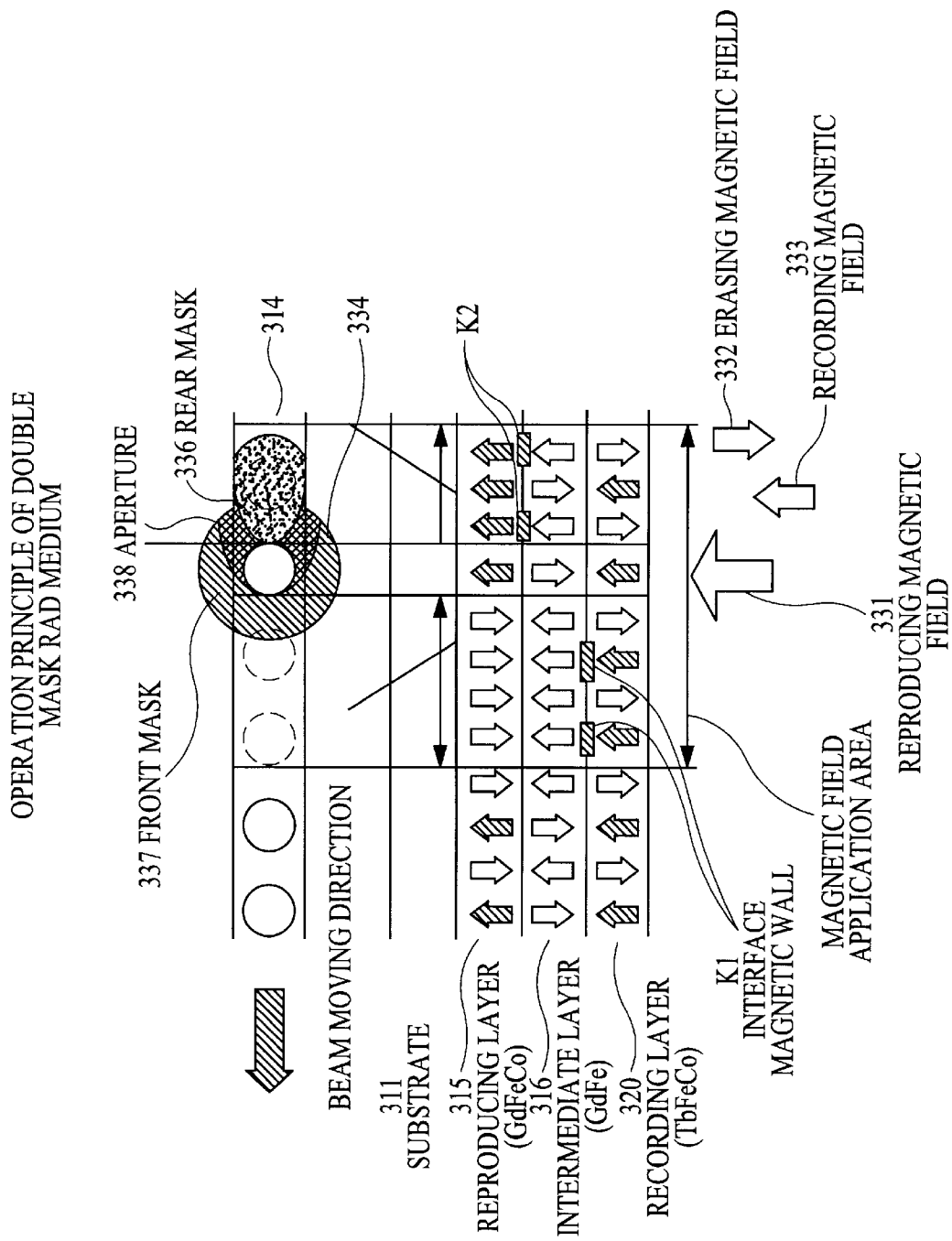
FIG. 18 is a diagram illustrating the reproduction principle of the double mask RAD medium.

Next, an example using the double mask RAD system of the MSR magneto-optical storage medium illustrated in FIG. 18 will be explained. The MSR medium in this example has a structure, such as disclosed in Japanese Published Unexamined Patent Application No. HEI 10-134429, wherein a base layer (SiN), a reproducing layer 315 (GdFeCo), a switch layer (intermediate layer 316) (GdFeCo), a recording layer 320 (TbFeCo), and a protection layer (SiN) are sequentially formed on a polycarbonate substrate 311. In FIG. 18, the base layer and the protection layer are simplified. As indicated by the arrow, the recording magnetic field 333 is in the same direction as the reproducing magnetic field 331, and the erasing magnetic field 332 is in the opposite direction. These fields are controlled to be in the range from about 200 to about 500 Oe.

First, the optical beam of an erasing power and the erasing magnetic field 332 are impressed to the medium to downwardly align the magnetizing direction of the recording layer 320. The optical beam of a recording power and the recording magnetic field 333 are then impressed to record a signal by allowing for the coexistence of the upward and the downward magnetizing directions of the recording layer 320.

The reproducing operation principle of the double mask RAD system can be realized by impressing the optical beam of a reproducing power and the reproducing magnetic field 331 to the magneto-optical storage medium. In the low temperature region (lower than about 100° C.), which is the front side of the optical beam along its direction of movement, the exchange coupling force between the intermediate layer and the recording layer is rather weak, and magnetization of the intermediate layer aligns in the direction of the reproducing magnetic field (the upper direction). The exchange coupling force between the intermediate layer and the reproducing layer masks the magnetizing direction of the recording layer in alignment with the downward direction of the magnetizing direction of the reproducing layer (i.e., a front mask).

Moreover, the high temperature area (higher than about 180° C.) exceeds the Curie temperature of the intermediate layer, and the exchange coupling force between the intermediate layer and reproducing layer is essentially negated. Therefore, the magnetizing direction of the reproducing layer aligns in the upward direction with the magnetizing direction of the reproducing magnetic field to mask the magnetizing direction of the recording layer (i.e., a rear mask).

In the intermediate temperature area (which is about 100 to 180° C.) between the low temperature area and the high temperature area, the magnetizing direction of the recording layer is transferred to the reproducing layer to form an aperture with the exchange coupling force between the recording layer and reproducing layer via the intermediate layer. As explained above, with the double-mask of the front mask and rear mask is formed, when a magneto-optical output is detected, the low temperature area and high temperature area work as the mask within the laser spot 334 located on the track 314, and the magneto-optical signal is not read in these areas because such magneto-optical signal can only be read in the intermediate temperature area.

Figure 3A:
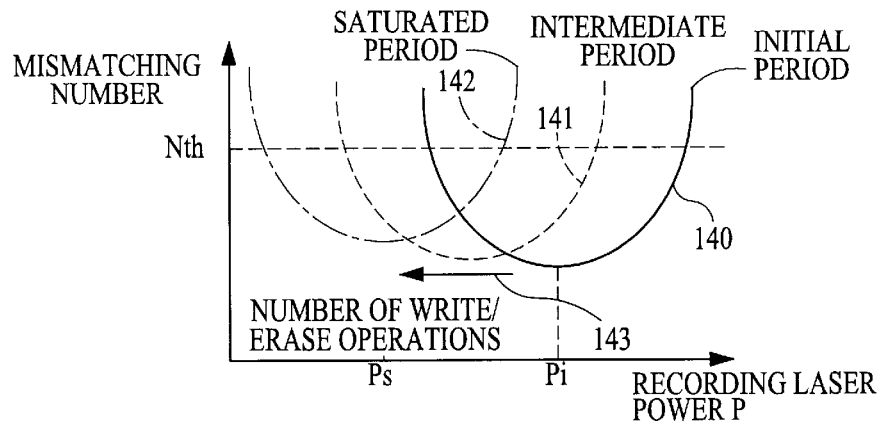
FIGS. 3(A)–3(C) are graphs showing changes of the optimum recording laser power due to sensitivity shifts.

An analysis of the problems causing recording errors has shown that the optimum recording laser power often changes (hereinafter termed a "sensitivity shift") as the erase operation and the write operation are repeated numerous times. For example, it is assumed that initially where erase and write operations have not yet been carried out upon the optical storage medium, that the mismatching relationship (i.e., the mismatch between the original data and that data recorded and reproduced) with respect to the recording laser power P is shown by curve 140 of FIG. 3(A). This curve 140 shows that under the initial conditions, the optimal laser power (i.e., that which generates the lowest mismatching number) is that designated as Pi.

When there is no sensitivity shift, movement of the characteristic curve 140 in the horizontal direction does not occur, even after the erase and write operations have been repeated. However, when a sensitivity shift occurs, the behavior observed is that although the mismatching relationship between the recording laser power P and the reproduced data in the initial condition was indicated by the characteristic curve 140, this characteristic curve shifts to the characteristic curve 141 as the number of erase and write operations increases. The characteristic curve continues to shift in the direction of arrow 143 as the number of erase and write operations increases, until the curve is finally shifted to the characteristic curve 142. When the sensitivity shift reaches the characteristic curve 142, it has reached a saturated condition, and no further sensitivity shifts can be observed, even when additional erase and write operations are performed.

During such a sensitivity shift from the initial condition to the saturated condition, the optimum laser recording power (in which the number of mismatchings of the reproduced data is minimized) gradually lowers from Pi to Ps. Such a shift from the characteristic curve 140 (with its optimum laser power of Pi) to the characteristic curve 142 (with its optimum laser power of Ps) could take approximately fifty thousand erase and write operations.

Figure 3B:
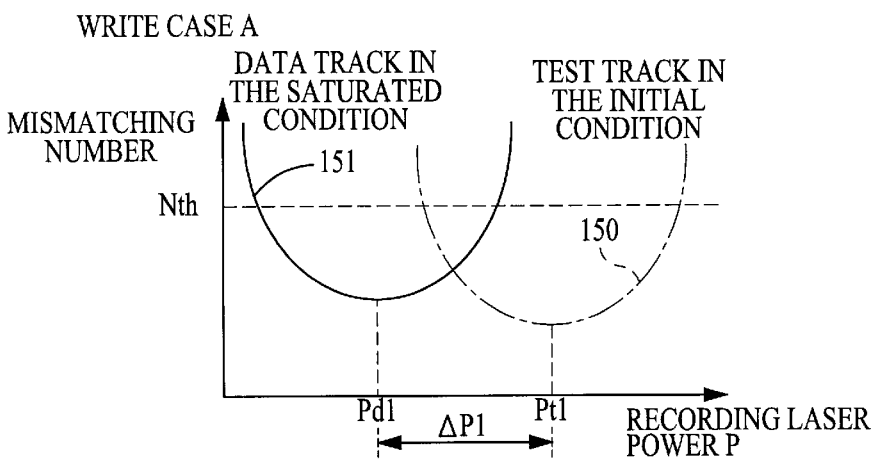

When the recording power calibration process (hereinafter called the test write process) is performed under an initial condition where there has been no sensitivity shift of the test track, as in the characteristic curve 150 of FIG. 3(B), the optimum recording laser power Pt1 is obtained. However, in a data track where a sensitivity shift is in a saturated condition in the FAT (file allocation table area), as shown by characteristic curve 151, for example, Pd1 is the optimum recording laser power value.

Therefore, the value attained by subtracting the difference ΔP1 from the optimum recording laser power Pt1 of the test track can be calculated as the optimum recording power Pd1 of the data track in the saturated condition. Therefore, like the characteristic curve 161 in FIG. 3(C), when the above calculation for compensation is performed with the optimum recording laser power Pt2 obtained by conducting a test write in the test track where the erase and write operations are repeated frequently for fifty thousand times or more, the optimum recording power of the data track can be obtained as Pc=Pt2−ΔP1.

Figure 3C:
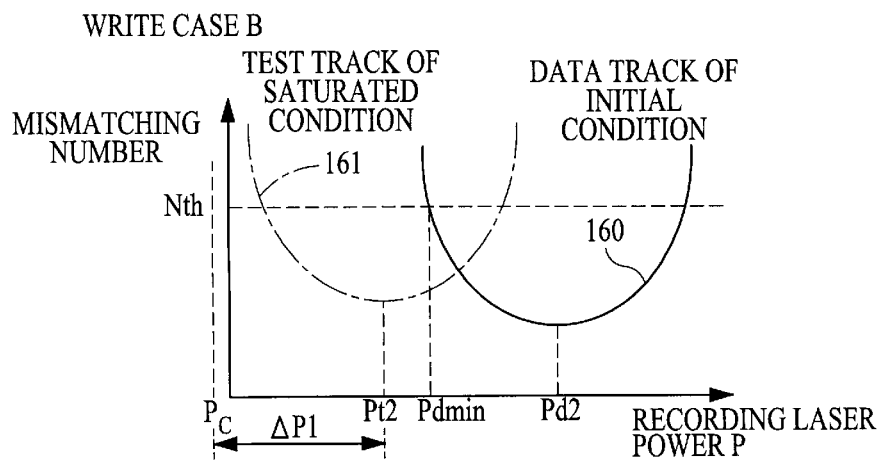

When recording is conducted upon a data track having the characteristic curve 160 of FIG. 3(C), which is a data track that is almost unused and has no sensitivity shift, the specified maximum number of mismatchings Nth cannot be satisfied if the recording is not performed at a value at least equal to the minimum value Pdmin. Additionally, in situations such as that depicted by FIG. 3(C), the calculated value Pc may end up being too small of a value, and thus the recording laser power represented by value Pc may not be large enough to actually write data to the medium.

Since the conditions on the test track are not always the same as those on the data track of the magneto-optical storage medium, and moreover since particular areas of the data track may be frequently used, but certain areas may not yet have been used at all, it has been shown that recording errors are generated because the sensitivity is not constant among all areas of the data track or among the data track and the test track.

Moreover, as the erase, write and read operations are repeated upon a medium that has undergone a sensitivity shift, writing to the alternate area (i.e., the area upon which data is written as an alternate to writing upon a defective sector) is infrequent at first, but as the sensitivity shift of the test write track increases, the difference between the optimum recording power value obtained by the test write and the optimum recording power of the data track gradually increases. This fact means that recording errors will be generated more frequently, which creates a problem by consuming the designated alternate area. Besides the problem of consuming the alternate area, this situation also results in a reduction in the access rate because of the increased use of the alternate write process (i.e., there is an increase in the number of rewrites to the alternate area required due to writing errors).

Accordingly, when a magneto-optical storage medium having a sensitivity shift is used, such problems can be solved by a sensitivity shift saturation. This sensitivity shift saturation process involves the repetition of a high power process of radiating the medium with a beam of a power that is higher than the ordinary power. In this case, the magnetic field is impressed upon the medium in a predetermined direction. In the following embodiments, the magnetic field is impressed upon the medium in the erasing direction, but it is also possible to impress the magnetic field upon the medium in the write direction.

The causes that generate the sensitivity shift are not precisely known yet, but a curve like the letter U, as shown in FIG. 3, shows that the width of the range of the optimum recording power is not so large. In order to assure that the recording power is within this optimum range, the present invention has been proposed.

Although the principle of sensitivity shift saturation has also not yet been proven, a certain change is generated in the characteristic of the recording layer of a medium when the medium is heated up to a temperature that exceeds the Curie temperature of the recording layer and the medium is subjected to impression of a magnetic field thereupon. When such changes are repeated, the sensitivity shift may move to the saturated condition.

It should be noted that sensitivity shift saturation may occur with a single relatively long, heating and impression process, as well as with a series of shorter processes. Therefore, it is thought possible to obtain similar effects not only by radiating the tracks of the medium with a high power beam, but also by using a means to heat the medium up to a temperature that exceeds the Curie temperature of the recording layer thereof, for example, by executing the high power process during a temperature adjustment using an oven.

Figure 4A:
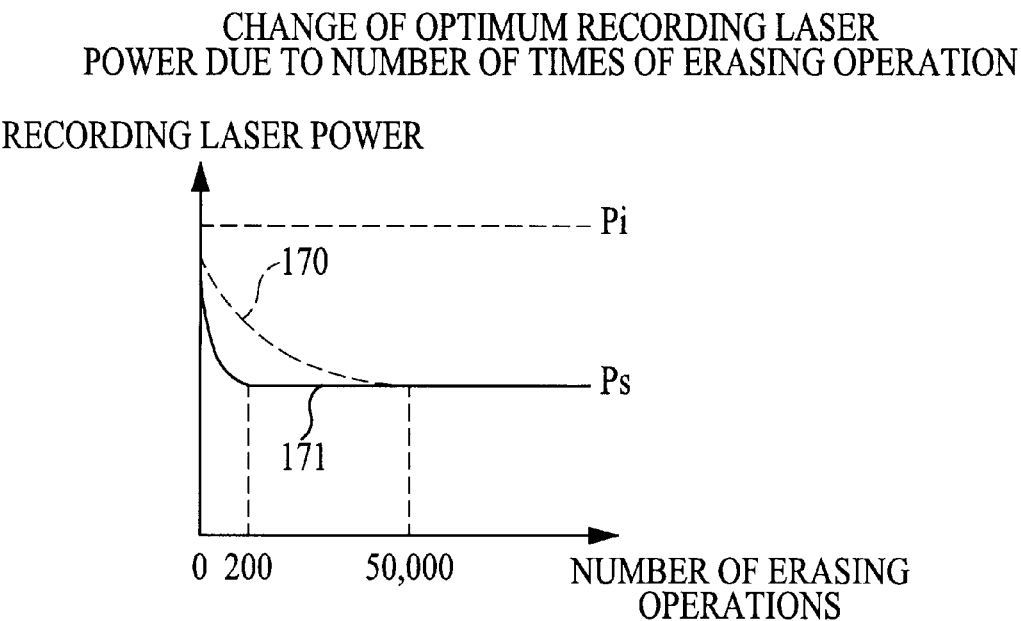
FIGS. 4(A)–4(B) are graphs showing a method for compensating for a change of the optimum recording laser power and the sensitivity shift depending on the number of times an erase operation is performed.

The relationship between sensitivity shift and recording laser power will now be explained. FIG. 4(A) shows a profile of the recording sensitivity shift when the erase and write operations are repeated for the MSR medium. A curve 170 corresponds to the laser power value under a usual application. In the initial condition, the optimum laser power is Pi, but as the erase and write operations are repeated, the sensitivity is gradually shifted to the high sensitivity side, and finally the optimum recording laser power shift almost disappears at the saturated value Ps.

The number of erasing operations required to reach the value Ps varies depending upon the laser power value used during the erase operations and the number of times the medium has rotated. For example, when the erasing operation is performed with a high power that has been increased by 20% over that ordinarily used for erase operations, the sensitivity shift can be accelerated in such a manner that Ps can be obtained by repeating the operation up to 200 times as shown by the curve 171 of FIG. 4. For example, a high power optical beam for high power processing can be obtained by setting the power at 9 mW in the inner area and at 12 mW in the outer area, where under ordinary operating conditions, the power is set at 7 mW in the inner area and at 10 mW in the outer area. Therefore, the more the power is increased by 20% or more, presumably, the lower number of repetitions required, and thereby the processing time can be reduced. Moreover, similar effects can also be obtained by reducing the number of rotations of the medium during the erase operation, that is, by reducing the number of rotations of the spindle motor 40 to a speed lower than that used in ordinary conditions such as the normal read/write operations conducted by a user. Thus, even if the laser power is not increased, a similar effect can also be expected by lowering the rotational speed of the medium. In the optical disk drive of this embodiment, since the spindle motor 40 is driven at the rate of 3214 rpm during ordinary recording and reproducing operations with an MSR medium, the rotating rate can be lowered to, for example, 2570 rpm during the high power processing. Further, when high power is combined with the low rotational speed, the number of repetitions required can be assumed to be reduced even lower than if either high power of low rotational speed is used alone. Accordingly, the processing time is thereby decreased. This is based on the principle that effects similar to those obtained under conditions in which the laser power is set to a high power can be obtained when the rotational speed is lowered, and thereby the laser radiation time is shortened because it is sufficient that the medium is heated up to a temperature higher than the Curie temperature of the recording layer of the MSR medium. Therefore, it is also possible to adjust the number of repetitions with the heating time.

However, when the medium is heated by the laser diode in the same area for a long period of time, this heating sometimes generates cracks in the medium. Therefore, in this embodiment, the high power process is realized only by changing the operating conditions of an ordinary optical disk drive. That is, such a high power process can be attained by repeating operations in which the optical beam follows the spiral track of the optical disk, and when it accesses the final sector of the final track, a track jump is conducted to return the optical beam to the first sector of the first track. Moreover, when these repeated erase operations are combined with a reduced high power process (i.e., one in which the laser diode power is increased by only 20% or less), the load of the laser diode unit 30 can be reduced without requiring that the laser diode unit 30 be driven with such a high power as that required for processes without repeated erase operations.

A high power erasing process will be explained next. When an optical storage medium having such a sensitivity shift is used, the erasing operation is performed, prior to the information recording, in a power that is higher than that used for ordinary operations. This high power erasing process is performed upon the test track, or upon both the test track T and the data track D, for the required number of times until the optimum recording laser power reaches the Ps value of FIG. 3(A). The high power erasing process may be performed during the manufacturing process or during the certifying operation in which a search is made to find the defective point of the medium. In this case, the erasing condition does not require the DC erasing or the high frequency superimposed erasing.

Certification is executed when the medium manufacturer conducts formatting where the optical disk drive executes high power processes in a manner that differs from the formatting processes that are conducted by an ordinary user, and with special commands that are different from the ordinary read/write commands. Moreover, it is also possible to form the optical disk drive to behave as a storage medium manufacturing apparatus which is customized by introducing the high power processing from the medium manufacturer. In addition, the MPU of the optical disk drive may be programmed to initialize the high power process without any instructions from the user.

In the preferred embodiment, since several thousand hours will be required to complete the high power process upon the entire medium (i.e., including both the test tracks and data tracks), this high power process is conducted only upon the test tracks, which is provided as several tracks in each zone performing the high power process upon the test tracks, the process time is greatly reduced. Of course, the effects of the sensitivity shift disappear to a larger extent in the entire area of the medium when the high power process is conducted upon the entire medium.

Figure 5:
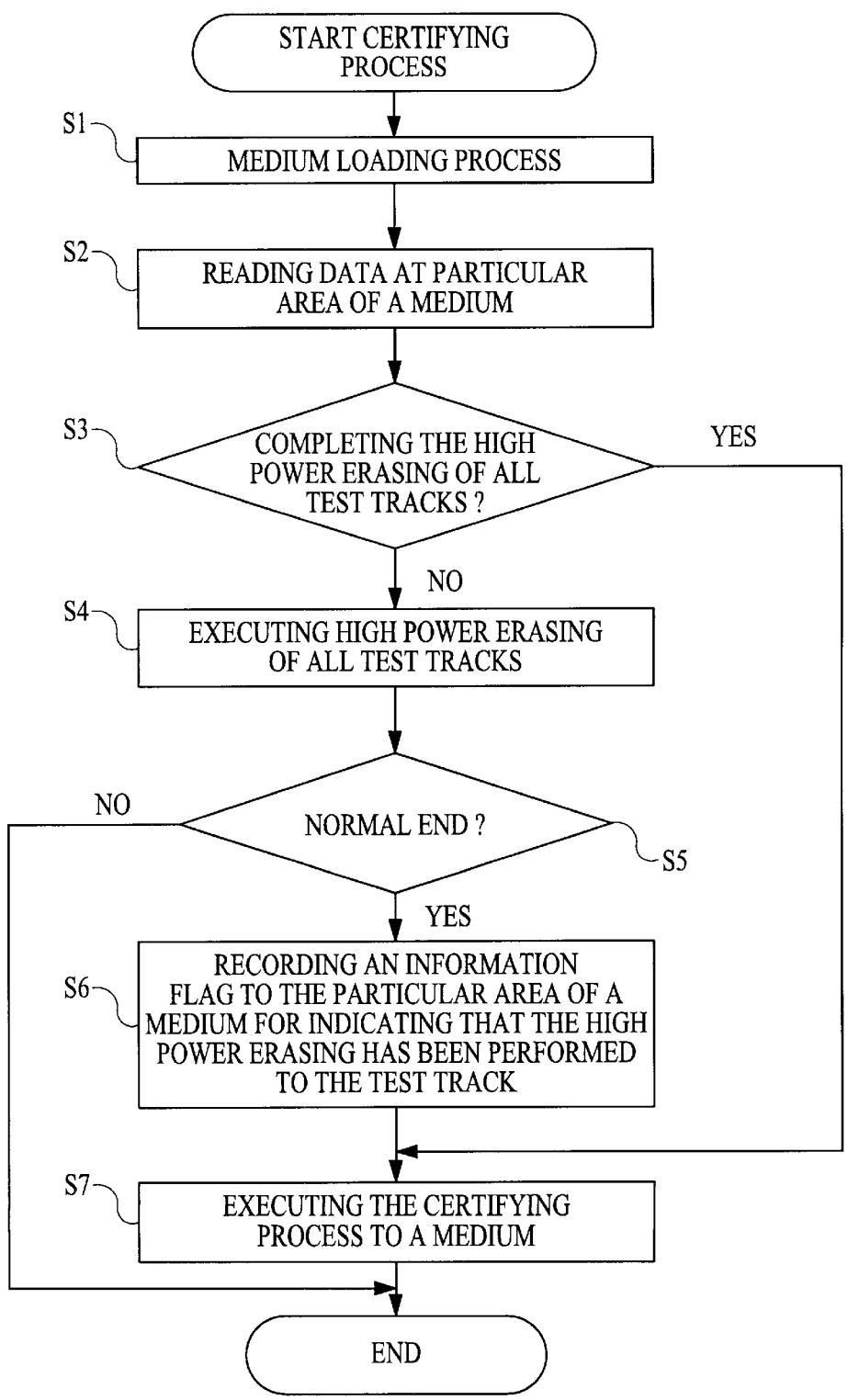
FIG. 5 is a flowchart for conducting a high power erasing process during the certifying operation of a medium.

FIG. 5 shows a flowchart for executing the high power erasing process during the certifying operation of the medium. In the certifying operation, the medium is searched during the manufacturing process for defective points, and such defective points are recorded to the primary defect list (PDL) on the medium. Thereafter, the detected defective points are recorded on the secondary defect list (SDL) on the medium.

First, as shown in FIG. 5, the loading process is executed to set the medium to the read and write enabling condition in step S1. In step S2, the particular area of loaded medium is read, and in step S3 a determination is made as to whether the high power erasing has already been performed or not. The "particular area" referred to above is an area which is not generally used by a user. For example, it may be a predetermined sector of the control track where the format information of the medium and the control information such as PDL, SDL, etc. are recorded.

If it is determined that the high power erasing of the test track has not yet been conducted, high power erasing is performed for all test tracks in step S4. If it is determined that the high power erasing of the test track has been conducted, only the certifying operation of step S7 is executed and the process is completed. Whether the high power erasing of the test track has been completed normally or not is determined in step S5 after the process of step S4. When the high power erase has not been completed normally, the process is terminated. If a normal completion is determined in step S5, in step S6 a predetermined value is written into the particular area in order to leave information indicating that there has been an execution of the high power erasing of the test track. Then the certifying operation for the medium is performed in step S7, which completes this operation.

Since the recording power sensitivity changes depending on differences of application frequency to different test tracks, therefore different optimum powers can sometimes be obtained depending upon which test write area is accessed. However, the present invention assures that almost the same optimum power can be obtained at any test write area because all test tracks should provide the same optimum power. Therefore, the reliability of the optimum power obtained by the test write should be sufficient.

The high power process implemented during the certifying operation of the medium is described in FIG. 5, but this high power process may instead be conducted during the loading of the medium, during command waiting time or during the retry at the time of detecting recording error. With this high power process, the influence of the sensitivity shift on the test track can be eliminated.

Figure 17A:
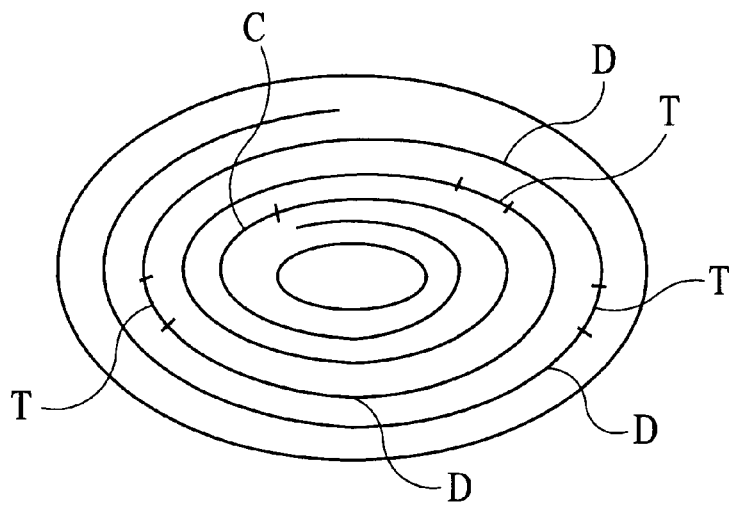
FIG. 17(A) is an explanatory diagram of an optical storage medium of one embodiment of the present invention.

A flag indicating that the high power process has been conducted is left in a particular area of the medium that is not normally used by a user (such as in control area C, etc. of FIG. 17(C)). This flag is used to signify that this process need not be performed again.

When this high power process is conducted, the erasing process is disabled if an error is generated in the servo control. Therefore, the tracking error detecting standards wherein the generation frequency is set to the highest value, and the detection level for flaws in the medium and the optical disk drive are reduced as compared to usual applications. This is the case because the tracking error sensitivity need not be as high in the high power process as it is in under normal conditions. Here, in the high power process, the MPU sets the offtrack slice level of the TES detecting circuit 50 to a higher level (to 75% from 53% of the half value of amplitude) during the high power processing.

Figure 4B:
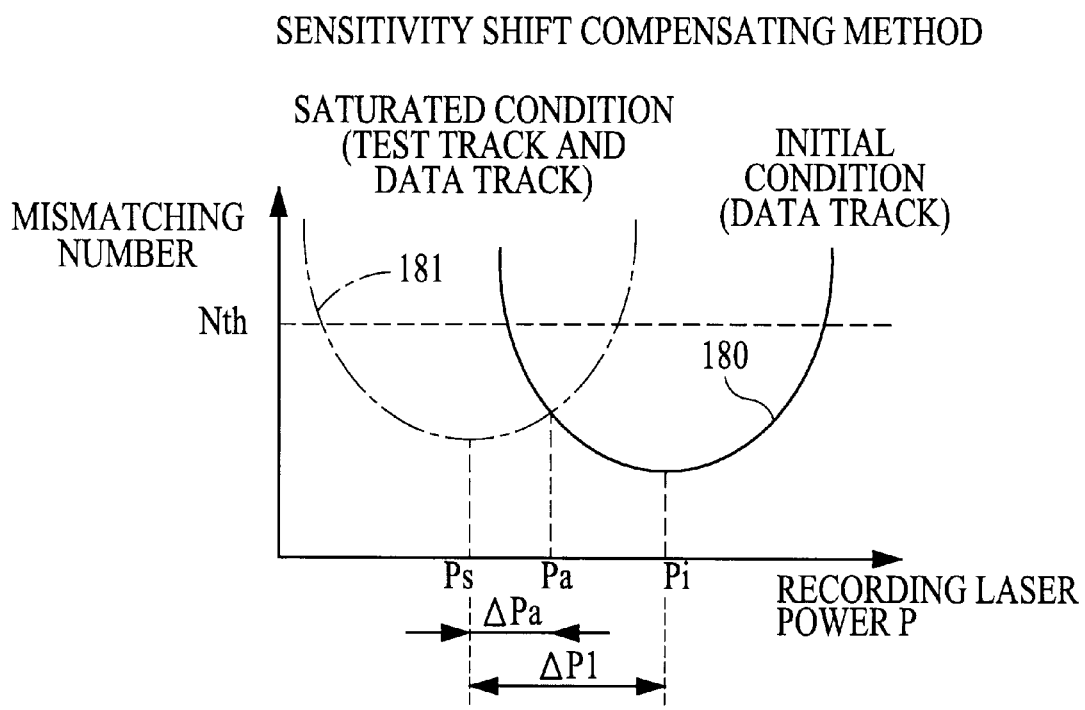

Moreover, as shown in FIG. 4(B), there is a value Pa that satisfies the predetermined threshold value of mismatchings Nth both when the sensitivity shift does not exist as shown in characteristic curve 180 and also when the sensitivity shift exists as shown in characteristic curve 181. On the other hand, the optimum laser power to write data to the data track exists when there is no sensitivity shift as shown in the curve 180 of FIG. 4 and when sensitivity shift is saturated as shown in the characteristic 181, and therefore it is in the range from Pi to Ps. The recording laser power of a data track satisfying the predetermined threshold value of mismatching Nth can be obtained at both areas (areas of different sensitivities depending on the application frequency of data track) where there is no sensitivity shift of the data track or where the sensitivity shift is saturated by adding a difference (a sensitivity compensating amount) ΔPa between Pa and Ps to obtain the optimum recording laser power Ps obtained by the test write.

Figure 6:
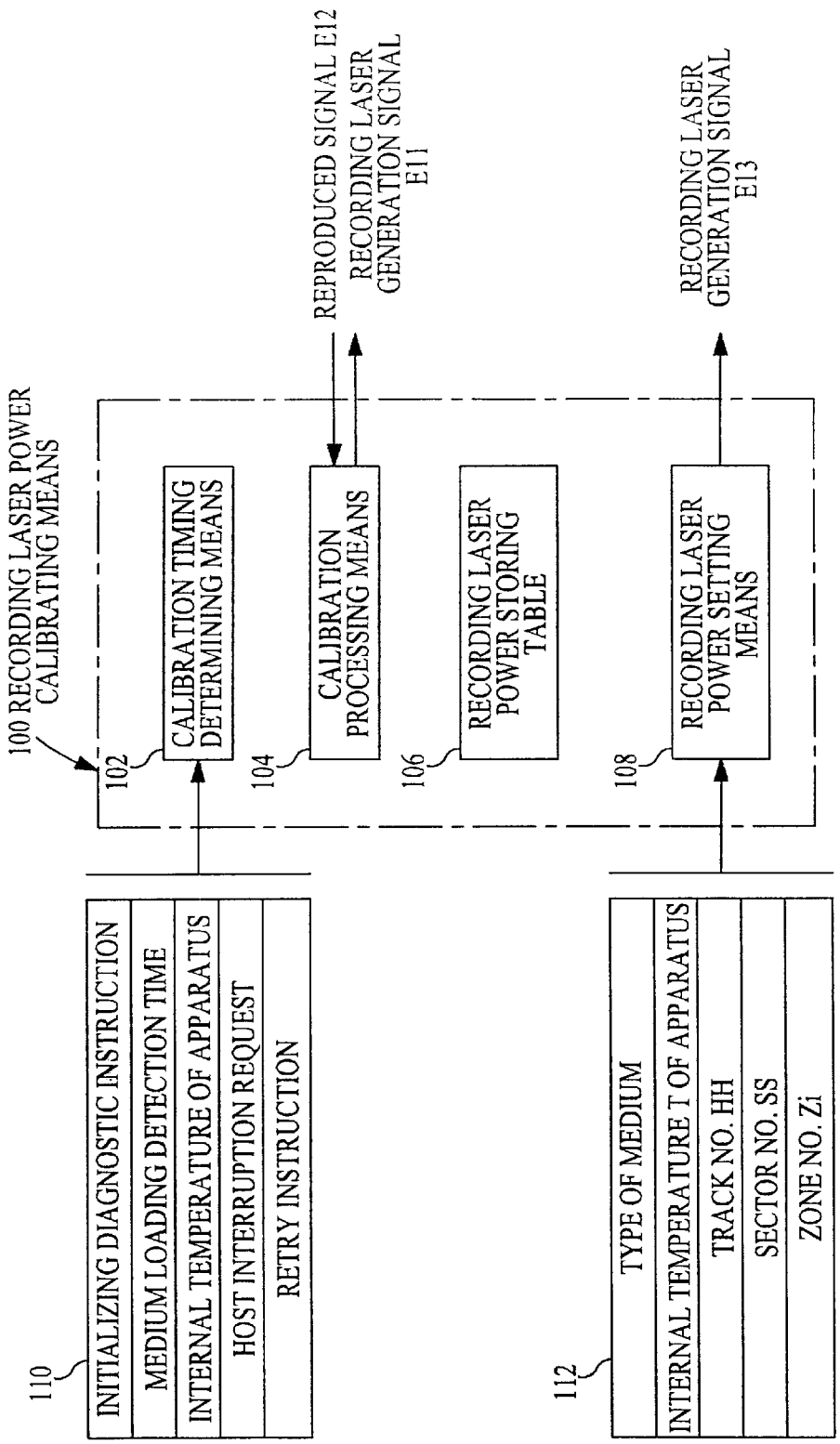
FIG. 6 is a functional block diagram of the recording laser power processing means realized by an MPU.

The recording laser power calibration process will be explained next. FIG. 6 is a functional block diagram of the recording laser power calibration process for calibrating the recording laser power generated by driving the recording laser power setting means, which is realized as a processing function of the MPU14 of the optical disk drive of FIG. 1. The laser power is calibrated to the optimum value using as an example the RAD medium shown in FIGS. 17(A), (B).

In FIG. 6, the recording laser power calibrating means 100 realized by the processing function of the MPU is provided with a calibration timing determining means 102, a calibration processing means 104, a recording laser power storing table 106 and a recording laser power setting means 108. The calibration timing determining means 102 sets the recording laser power calibration process timing to drive the calibration processing means 104 depending on the setting contents stored in the register group 110.

In the register group 110, an initializing diagnosis instruction, a medium loading detection, an inside temperature of the apparatus, an interrupt request to the host and a register registration of retry instruction are performed, and the calibration processing means 104 is driven by reading these register contents with the calibration timing determining means 102. For example, the calibration processing means 104 is driven, in the calibration timing determining means 102, when the initial diagnosis is conducted because the power switch of apparatus is turned ON, and when loading is detected because a processing storage medium is loaded into the apparatus, when a temperature change within the apparatus exceeds the predetermined value, when the predetermined calibration effective time has passed (neglecting the time passage from the total calibrating process) and when the retry process is conducted because a reproducing error is generated.

In addition, for example, the calibration process of the calibration processing means 104 may be driven with the calibration timing determining means 102 by setting a dip switch, etc. at the time of the factory set-up for delivery after the apparatus is completed in the factory stage. Moreover, the calibration timing determining means 102 can drive the calibration processing means 104 with a command instruction from the host apparatus.

Moreover, upon receiving an interruption request from the host apparatus for interrupting a read or a write operation, the calibration timing determining means 102 checks whether the calibration processing means 104 is in the processing mode or not. When the calibration processing means 104 is in the calibration processing mode, the means 102 stops the calibration process, gives priority to the access by the interruption request from the host apparatus and restarts the operation of the calibration processing means 104 from the interrupted mode after completion of the interruption request process.

The calibration processing means 104 operates by receiving the calibration process drive request from the calibration timing determining means 102, determines the reproducing condition from the reproduced signal obtained from the reproducing means while changing the recording laser power by changing, step by step, the drive current applied to the laser diode unit 30. The calibration processing means 104 also obtains the optimum recording laser power resulting in the recording ready condition, and stores this laser power valve in the recording laser power storing table 106.

The calibration process for recording the laser power is performed by the calibration processing means 104 for each zone, or for several zones, of the optical storage medium. The optimum recording laser power is then registered for each zone in the recording laser power storing table 106.

FIG. 7 shows one example of a recording laser power storing table 106. For example, the optical storage medium may be divided into 11 zones, as indicated by the different zone numbers i. The optimum recording laser power (Pz1 to Pz11) obtained by the recording laser power calibrating process for each zone is stored in the medium. It is preferable that the track chosen for conducting the optimum recording laser power calibrating process is selected to be either the leading track or the final track of the boundary of each zone. The calibration process is conducted at either the leading track or the ending track of the zone to simplify the arithmetic processes when the recording laser power means 108 of FIG. 6 refers to the recording laser power storing table 106 in order to calculate (with linear interpolation) the recording laser power that provides the optimum recording laser power of a particular track in the desired zone.

Figure 8:
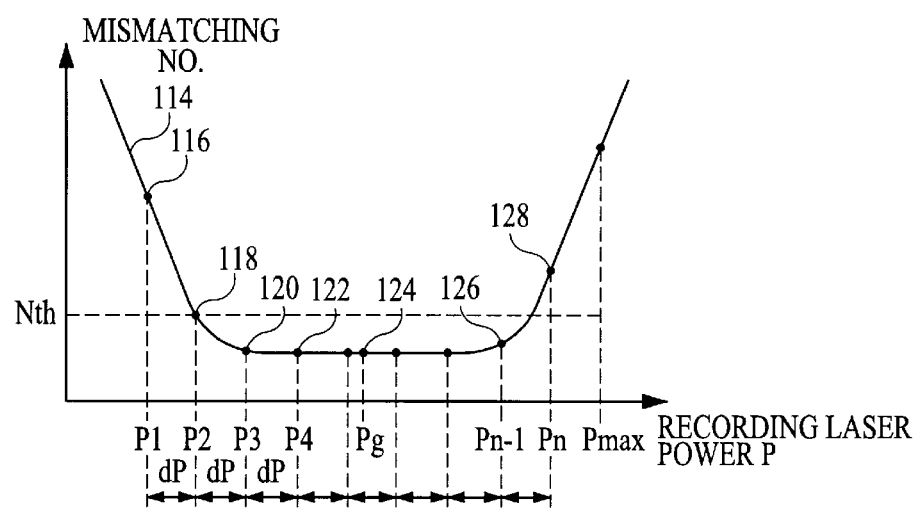
FIG. 8 is a characteristic curve of the mismatching number for changes of recording laser power in the recording laser power calibration process of FIG. 6.

FIG. 8 shows a graph of the recording laser power calibration process procedure executed by the calibration processing means 104 of FIG. 6. The recording laser power P, which is changed step by step, is plotted in the horizontal axis, and the mismatching number, obtained by comparing bits of the reproduced data, is plotted on the vertical axis.

First, the graph has a shape indicated by a straight line, such as near point 116. Namely, in the first portion of the curve 114, if the recording laser power P is low, the mismatching number becomes large. When the recording laser power P is increased in order to perform recording and reproducing operations, the mismatching number decreases and then becomes almost constant between points 120 and 126.

When recording and reproducing operations are performed by further increasing the recording laser power, such as around point 126, the mismatching number also increases from about this point. The recording laser power can be set to a value near that found at the approximate center point 124 of the flat area in order to maintain the minimum value of the mismatching number for the mismatching number characteristic curve 114.

The characteristic curve 114 of FIG. 8 can be obtained experimentally by setting the environment temperature in the apparatus to room temperature of 25° C., for example, and by raising and lowering the recording laser power P until the mismatching number obtained equals the predetermined threshold value Nth (at point 118 with a power of P2). The recording laser power P should then be increased step by step from the recording laser power initial value P2 that corresponds to the point 118.

However, since the characteristic curve 114 shifts in the horizontal axis direction depending on the temperature, the recording laser power initial value P2 does not always correspond to point 118. Therefore, in the recording laser power calibrating process of the present invention, the recording laser power P is increased step by step (P by the increment dP) from the recording laser power P1, which is a value determined by subtracting the predetermined value dP from the recording laser power initial value P2. Since the value lowered by dP from the recording laser power initial value P2 is defined as the minimum value for the recording laser power calibrating process, if the characteristic curve 114 is shifted due to a change in temperature, the starting position of the recording laser power calibrating process can be set to be the part of the curve where the mismatching number is higher than the threshold value Nth, and the shoulder portion of the characteristic curve 114 can certainly be detected by increasing the recording laser power step by step from the value P1.

In FIG. 8, the mismatching number is obtained by conducting recording and reproducing operations while increasing the recording laser power step by step from the minimum recording laser power P1. The point Pg, which is the optimum recording laser power of the characteristic curve 114, is arrived at by obtaining the mean value of the recording laser power between the point where the mismatching number becomes lower than the threshold value Nth and the point immediately before the point where the mismatching number becomes higher than the threshold value. Thus, Pg is obtained from the following equation:

$$Pg=(Pn-1-P2)/2$$

This value Pg is registered in the recording laser power storing table 106 of FIGS. 6 and 7 as the optimum recording laser power of the test track. If the recording laser power is set to a value that is too high for the recording laser power calibrating process, the laser diode element may break. Therefore an upper limit recording laser power Pmax is set.

Figure 9:
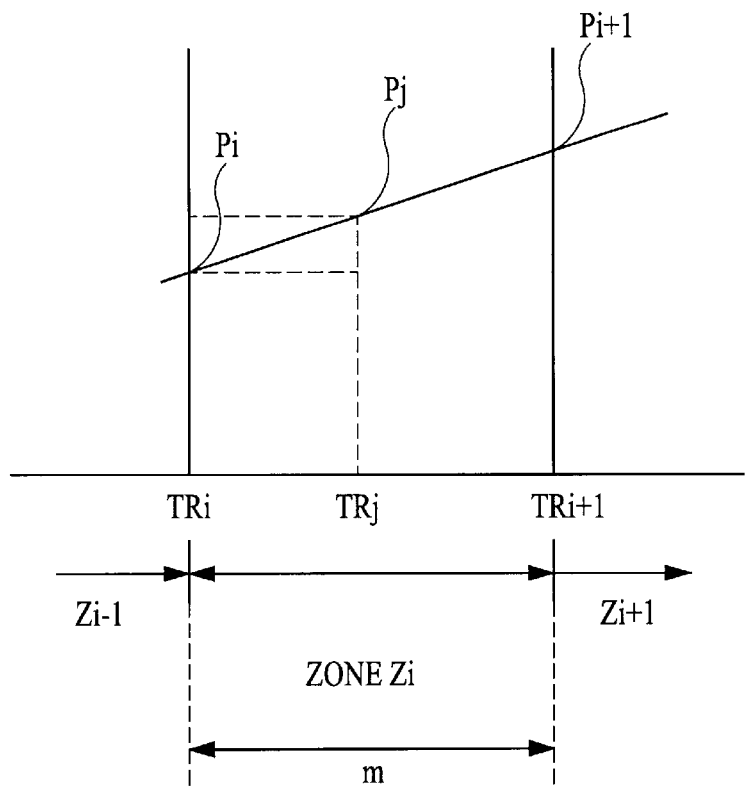
FIG. 9 is an explanatory diagram showing a linear interpolation by the recording laser power setting means of FIG. 6.

FIG. 9 shows the process used to obtain the recording laser power corresponding to the actual access track. This recording laser power is obtained from a linear interpolation of the recording laser power values stored in the recording laser power storing table 106 (FIG. 6 and 7), as executed by the ordinary recording processes that are performed after the calibration process is completed in the recording laser power setting means 108 of FIG. 6.

In the recording laser power setting means 108 of FIG. 6, the type of medium, the temperature T in the apparatus, the track number HH based on the write command, the sector number SS and the zone number Zi are set to the register by the register group 112. The recording laser power setting means 108 then calculates the optimum recording laser power required for access position by linear interpolation based on the setting information of this register group 112, and outputs the recording laser power signal E13.

Referring again to FIG. 9, the principle for using linear interpolation to calculate the optimum recording laser power Pj, when designating track number TRj in zone Zi, will be explained. First, in this embodiment, the recording laser power setting means 108 accesses the optimum recording laser power Pi for the leading track number TRi of zone Zi which is registered in the recording laser power storing table 106. The optimum recording laser power Pi+1 for the track number TRi+1 of the leading position of the next zone Zi+1 is also accessed.

The optimum recording laser power Pj of track number TRj, which belongs to zone i, can be calculated by the following formula, which demonstrates linear interpolation where m is the difference (in number of tracks) between the leading track TRi and the last track TRie of the zone Zi.

$$Pj=Pi+\{(Pi+1-Pi)\}\cdot\{(TRj-TRi)/m\} \quad (1)$$

In FIG. 9, the optimum recording laser power in the leading track number of each zone is registered in the recording laser power storing table 106, but it may also be the laser power of the last track, or it may be the power of the center track.

Figure 10:
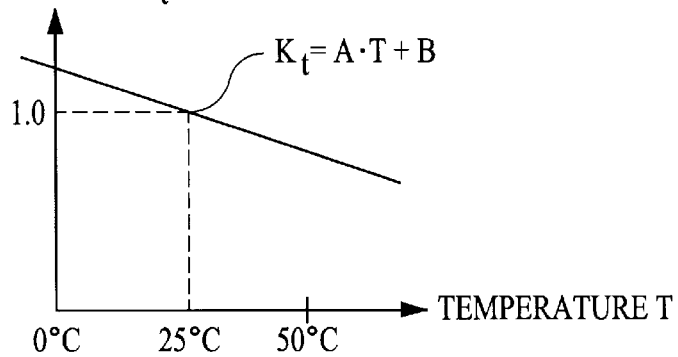
FIG. 10 is an explanatory diagram of the temperature compensation coefficient of the recording laser power setting means of FIG. 6.

FIG. 10 is a characteristic diagram of the compensating process in which the internal temperature T of the apparatus is compensated for in order to provide the optimum recording laser power. FIG. 10 is a characteristic curve of the temperature compensating coefficient Kt for compensating for the internal temperature T of the apparatus in the optimum recording laser power corresponding to the access position obtained by the linear interpolation of FIG. 9. This temperature compensating coefficient Kt is expressed by the following formula, and generally has a negative temperature coefficient.

$$Kt=A\cdot T+B$$

The temperature compensating coefficient Kt is 1.0 when the internal temperature of the apparatus is 25° C. The compensation amount for compensating the optimum recording laser power P can be calculated by the following formula, which uses the compensation temperature coefficient Kt given in FIG. 10.

$$P=P(1-Kt\times(T-25° C.))$$

Finally, the compensation amount corresponding to the sensitivity shift of the data area is added to the above power P, and this value is set as the optimum power for data recording to the data area.

$$P=P+\Delta Pa$$

It is also possible that the recording laser power can be compensated for depending on the linear approximation by the recording track or the apparatus temperature when the compensation amount ΔPa changes depending on the recording track position and temperature.

Figure 11:
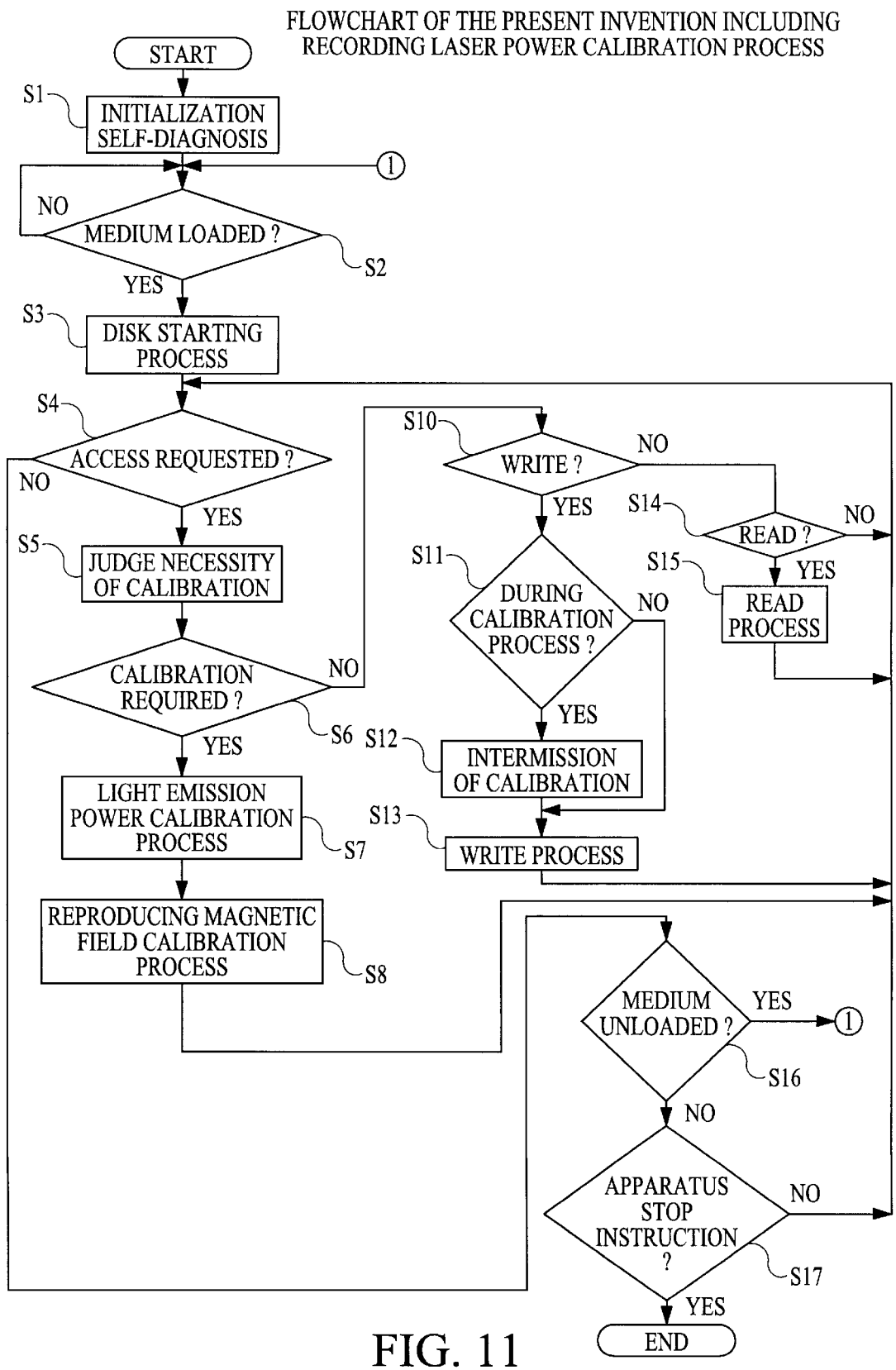
FIG. 11 is a flowchart of the processing operation of the present invention, including the recording laser power calibration process.

The process of the optical storage device of the present invention having the processing function of the recording laser power calibrating means 100 of FIG. 6 will now be explained. FIG. 11 is a flowchart of the total process of the optical storage device of the present invention. First, when the power is turned ON, the initialization and self diagnostic processes are performed in step S1, and in step S2, the process waits for the medium to be loaded. Under this waiting condition, when the medium is loaded, the process goes on to step S3 to perform the disk driving process.

Figure 12:
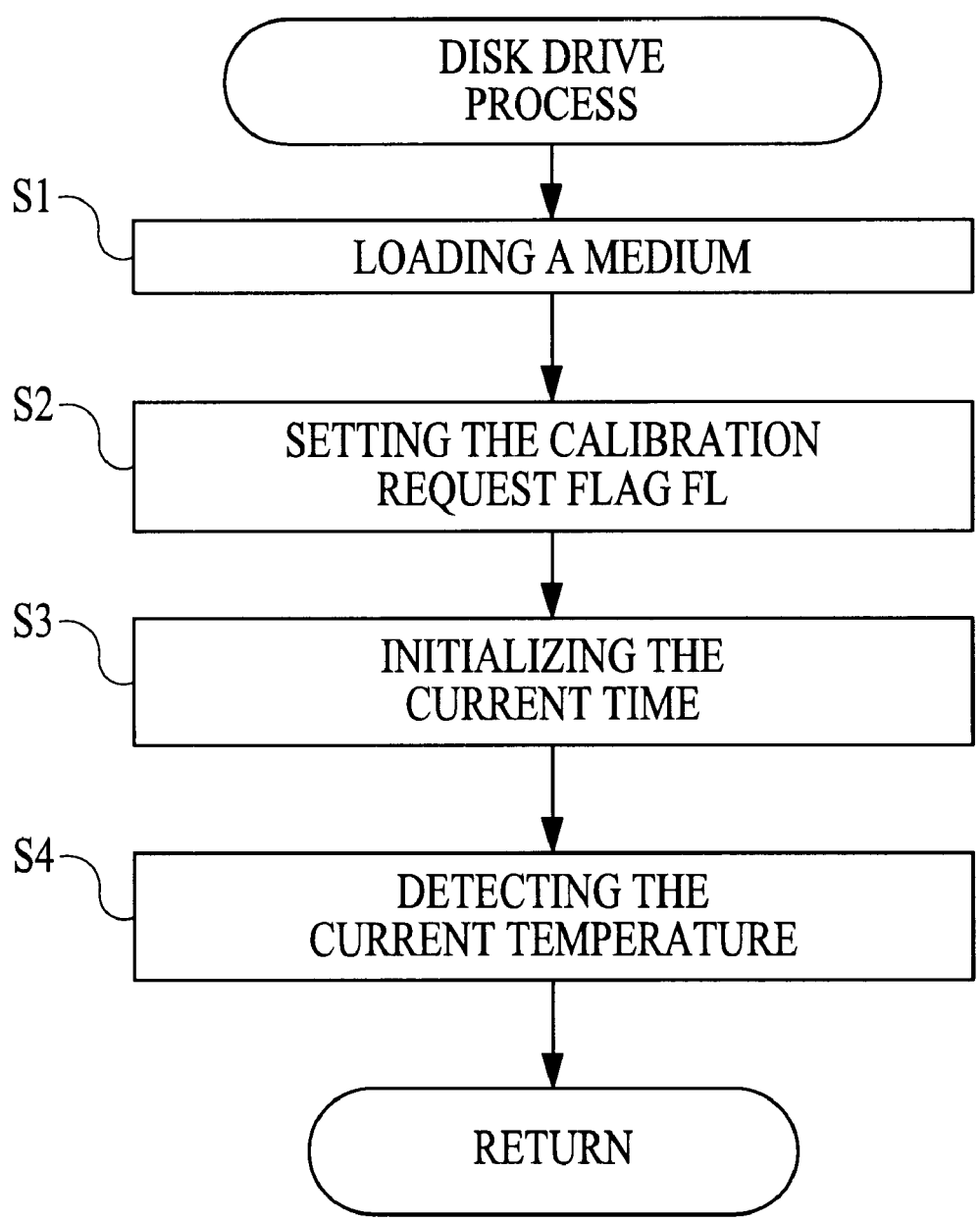
FIG. 12 is a flowchart of the disk drive process prior to the recording laser power calibration process of FIG. 9.

The disk driving process of step S3 is carried out as shown in the flowchart of FIG. 12. First, in step S1, the medium is loaded, and it is thereby set to the spindle motor to rotate at a constant speed as shown in FIG. 2. Subsequently, in step S2, a calibration request flag FL is set. Thereafter, in step S3, the current time is initialized, and in step S4, the current internal temperature T of the apparatus is detected. The execution of steps S1 to S4 completes the required processes, at the time of driving, that are needed to determine the light emitting power of the laser diode and to determine the reproducing magnetic field of the magnetic field impressing means.

Referring again to the flowchart of FIG. 11, when the disk driving process is completed in step S3, the process goes to step S4 to check for an access request from the host apparatus. In this embodiment, when the disk drive process is performed by loading of the medium, the calibration process for the light emitting power and the reproducing magnetic field is not conducted in this time. The first calibration process for the light emitting power and the reproducing magnetic field is initiated after receiving a calibration instruction command, which is issued from the host apparatus after it is alerted to the disk driving process. Therefore, the host apparatus first receives the calibration instruction command as the access request in the step S4, it identifies the necessity of the calibration process in step S5, it performs the calibration process for the emission powers such as the write power, the erase power and the read power in step S7 when necessity is acknowledged in step 56, and it also performs the reproducing magnetic field (readout magnetic field) calibration process in step S8.

When a write access request is issued from the host apparatus, as determined in step S10, it is next determined whether to conduct the write process immediately, or if the calibration process needs to be interrupted first. It is determined in step S11 whether the calibration process is being conducted or not. If the calibration process is being conducted, the calibration process is interrupted in step S12, and the write process is executed in the step S13. If it is determined in step S11 that the calibration process is not being conducted, no interruption step is necessary, and the write process of step S13 is immediately executed.

When the write process is completed, a check is made for write errors. If a write error is detected, the recording laser power calibration process is executed, and a retry process is thereafter conducted. In this case, the retry may be conducted by adding or subtracting, within a constant range, the value of the sensitivity shift compensating amount ΔPa to the recording laser power of the data track. If a write error is not detected in the retry process, it is determined whether or not the calibration process has been suspended. If the calibration process has been suspended, the calibration process is restarted from the point of interruption.

When it is determined in step S4 that an access request has not been issued, unloading of the medium is checked in step S16, and a medium unloading request is verified. When an unloading request is detected, the medium is unloaded, and the process returns to step S2 and waits for the next medium to be loading. When the medium is not unloaded in step S16, the apparatus stop instruction is checked in step S17. If no stop instruction has been received, the process returns to step S4 to wait for an access request from the host apparatus. Meanwhile, when a read access request is issued from the host apparatus, the read request is determined in step S14, and the read process is performed in step S15.

Figure 13:
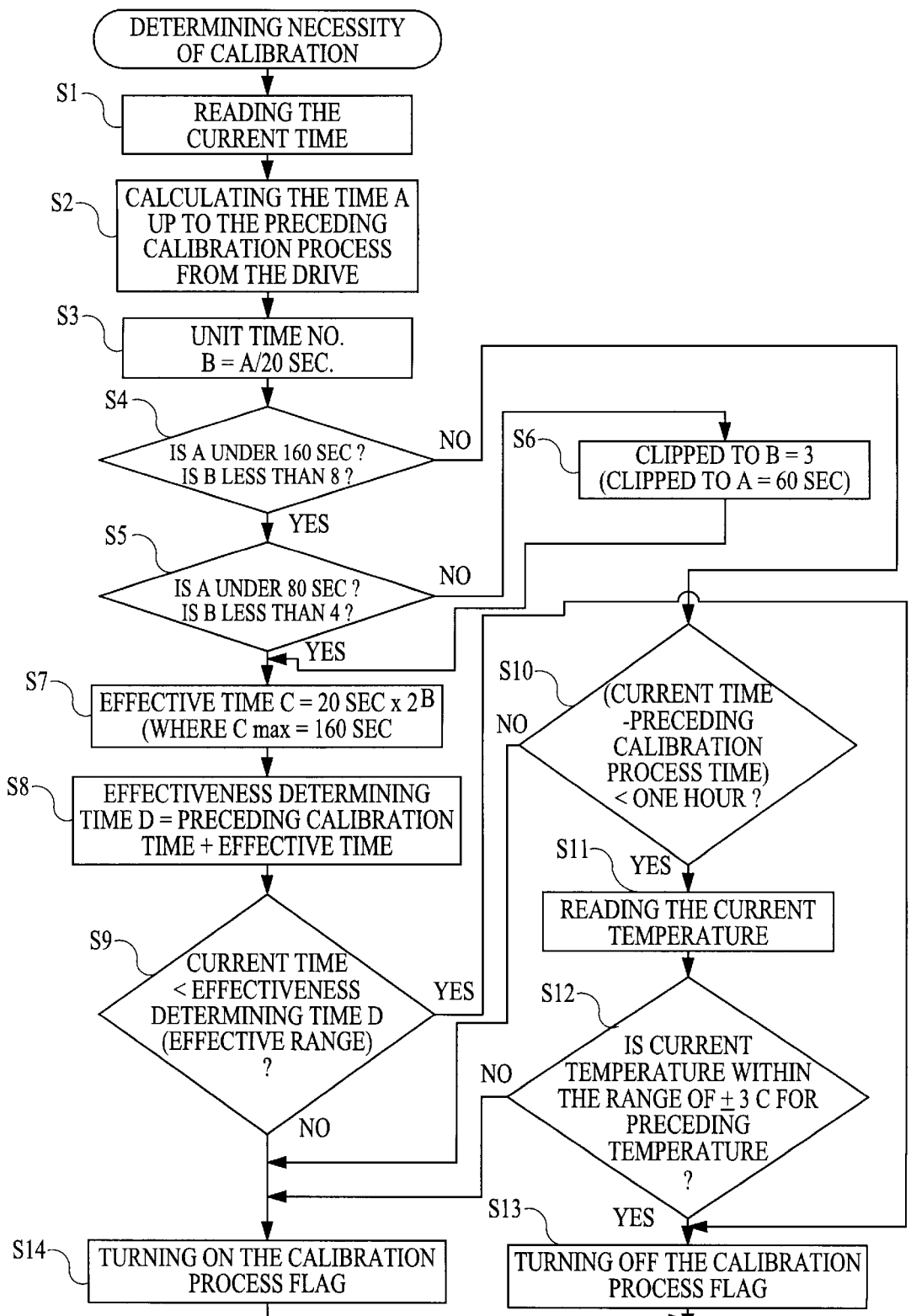
FIG. 13 is a flowchart for determining the calibration process of FIG. 11.

FIG. 13 is a flowchart of the process for determining the necessity of calibration set forth in step S5 of FIG. 11. For the calibration necessity determining process, the current time is first read in step S1, and the time A, which is the time preceding the calibration process from the start of the optical disk drive, is calculated in step S2. In the step S3, the time is converted to the unit time B by dividing time A by a predetermined constant time, for example, 20 seconds.

In step S4, it is determined whether the unit time B is under 8 or not, namely whether time A is under 160 seconds or not. When time A is under 160 seconds, the process goes to step S5 to determine whether the unit time B is under 4 or not, namely whether time A is under 80 seconds or not.

When time A is in the range between 80 seconds and 160 seconds, the unit time B is clipped to 3, namely the time A is clipped to 60 seconds in step S6 and thereafter the process continues to step S7. When time A is under 80 seconds in step S5, the process goes directly to step S7. In step S7, a calculation is made to determine the effective time C, in order to assure the use of the optimum values (i.e., the values of the light emitting power and the recording laser power) determined by the preceding calibration process.

In this case, the effective time C is defined as 20 seconds× $2^B$(unit time). However, the maximum value of the effective time C is limited to 160 seconds. As a result, the effective time C is set to the time corresponding to $2^B$ when time A is under 160 seconds, and when time A exceeds 160 seconds, the value C is fixed to the constant effective time where C=160 seconds.

Calculation of such effective time C is varied depending on the time required for the temperature of the medium loaded into the optical disk drive to be stabilized to the internal temperature of the apparatus. Namely, in the initial stage immediately after the medium is loaded, there is a difference between the medium temperature and the apparatus temperature, and effective calibration based on the internal apparatus temperature is impossible at this stage because of this temperature difference, and therefore the calibration process is not performed at this time.

However, the temperature of the loaded medium is equalized to the internal temperature of the apparatus after about one or two minutes from its loading time. Therefore, the first calibration process is conducted synchronously with the timing of the first issuance of a write command from the host apparatus to the drive of the optical disk drive.

The host apparatus issues write commands at various times. Time A (which is the time from the start of the drive to the time of the first adjustment for light emitting, as obtained in steps S1 to S7 of FIG. 13), and the effective time C (which is the time for determining the calibration timing after the next calibration) are both determined. After the effective time C is calculated in step S7, the effectiveness determination time D is calculated, in step S8, as the time where the calculated effective time C is added to the preceding write test time.

In step S9, it is determined whether the current time has exceeded the effectiveness determining time D. When the current time has exceeded the effectiveness determining time D, a calibration process flag is turned ON in step S14 (signifying that calibration is necessary), and the process returns to step S6 of FIG. 11. When the current time does not reach the effectiveness determining time D in step S9, the calibration process flag is turned OFF in step S13 (signifying that calibration is not necessary). Moreover, when the unit time B is 8 or more, namely 160 seconds or more in step S4, the process goes to step S10 to determine whether the time obtained by subtracting the preceding calibration process time from the current time is under one hour or not. When the time is under one hour, the current time is read in step S11, and it is determined in step S12 whether the current temperature is within ±3° C. of the preceding temperature. When it is within ±3° C., the calibration process flag is turned OFF, and the calibration process of step S13 is not performed. When a temperature change outside of the range of ±3° C. is detected, the calibration adjustment flag is turned ON in order to execute the calibration process of step S14.

Moreover, when the difference between the current time and the preceding calibration processing time is calculated in step S10 as being one hour or more, the calibration processing flag is forced to be turned ON in step S14 so that the calibration process will be executed. It should be noted that each threshold time set for the necessity determining process of this calibration process may be altered as required.

Figure 14:
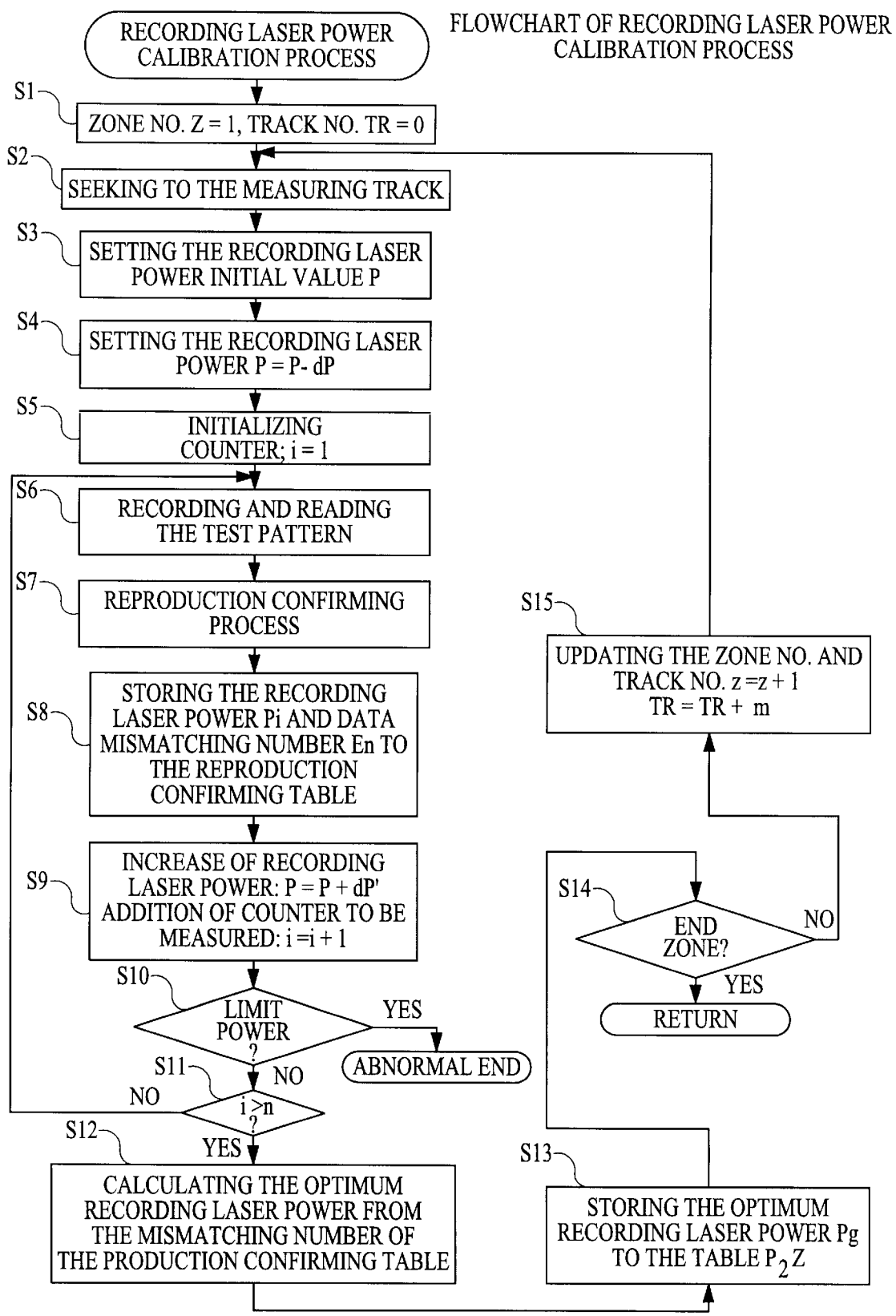
FIG. 14 is a flowchart of the recording laser power calibration process.

FIG. 14 is a flowchart of the recording laser power calibrating process performed by the calibration processing means 104 of the recording laser power calibrating means 100 of FIG. 6, which is conducted in step S8 of FIG. 11. First, in step S1, an initialization step for initializing the zone number (to Z=0) and the track number (to TR=0) is performed. Next, the measuring track is sought in step S2, and the initial value of the recording laser power (P) is set in step S3.

Subsequently, the starting value is set to a lower value in step S4. Specifically, the recording laser power is lowered by subtracting the predetermined value dP from the initial value P. As a result, the calibration process is started by setting the recording laser power P1 to the laser diode control circuit 24. Subsequently, in step S5 one (1) is set as a counter variable i, which keeps track of the number of times that the recording laser power has been changed. Thereafter, in step S6, a test pattern is recorded to the measuring position of the test track with the preset recording laser power. After completing the test write, the test pattern is read by setting the laser diode to the reproducing power, and by setting the magnetic field impressing unit to the current value in order to generate the predetermined magnetic field.

In step S7, the reproduction confirming process is executed. This reproduction confirming process may be performed in any one of the following ways. The first method of performing the reproduction confirming process is to detect whether the mismatching number (i.e., the number of bit errors) is equal to or less than the predetermined value. This mismatching number is obtained by comparing (bit by bit) the reproduced data with the recorded data (test pattern) at the predetermined reproducing position. Specifically, reproduction can be confirmed by detecting whether the number of ECC error corrections for the reproduced data is less than the predetermined value in the ECC processing means provided in the formatter 18 of FIG. 1.

Another method for confirming reproduction, for example, is a measurement of the error rate, which may be used in addition to the method explained above. After the reproduction confirming process is performed in step S8, in step 8 the recording laser power Pi and the mismatching number Eri are stored in the reproduction confirming table shown in FIG. 15. In step S9, dP' is added to the recording laser power P, and one (1) is added to counter value I. The value dP' of step S9 is related to the value dP of step S4 by the following formula: dP=dP'×(n/2), where n is the number of measurement times (as in step S11).

When the increased recording laser power P has exceeded a predetermined limit power, an abnormal end condition is determined in step S10. When the counter value i does not exceed the number of measurement times n of step S11, the operations from step S6 forward are repeated.

On the other hand, when the value of i does exceed the number of measurement times n of in step S11, the optimum recording laser power in the test track is calculated from the mismatching number in the reproduction confirming table in step S12. When this calculation is performed, the reproduction confirming table of FIG. 15 is used.

In this reproduction confirming table of FIG. 15, the measuring number i ranges from 1 to 11, and the recording laser power Pi and the mismatching number Eri from process steps S6 to S11 are stored. The point where the mismatching number is reduced to the threshold value Nth from the reproduction confirming table measuring number 1 and Er2, for example, and the point immediately before the point where the mismatching number increases again up to the threshold value Nth, for example, Er9, are obtained. The average Pg of the recording laser powers corresponding to the respective mismatching numbers can be calculated from the following formula:

$$Pg=(P9+P2)/2$$

The value Pg is defined as the optimum recording laser power used to record to the test track. This optimum recording laser power Pg is stored as PzZ in the recording laser power storing table of FIG. 7 (and this step of storing the value PzZ is referred to as step S13 in FIG. 14).

The process of step S 13 is repeated for each zone until it is determined in step S14 that the final zone has been reached. If it is determined that the final zone has not been reached, the zone number and track number are updated in step S15, and the process returns to step S2. Namely, the zone number Z is increased by one (1), such that Z=Z+1, and the track number TR is updated to the leading track number of the next zone by adding the number of tracks m of one zone, and whereby upon returning to step S2, a new measuring track is sought.

Figure 16:
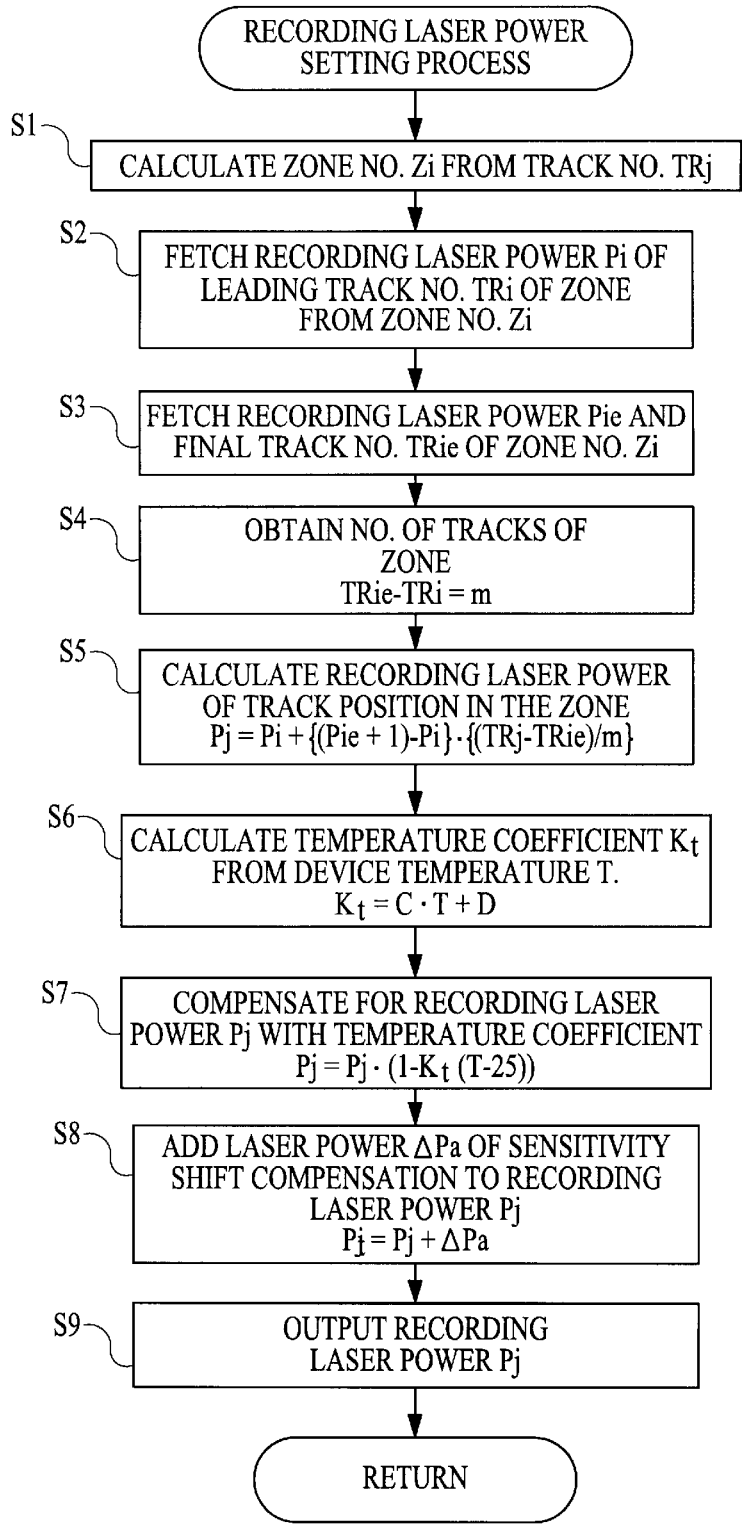
FIG. 16 is a flowchart of the linear interpolation process, the temperature compensation process, and the sensitivity shift compensation process performed by the recording laser power setting means of FIG. 6.

FIG. 16 is a flowchart of the optimum recording laser power setting process corresponding to the access position, which is performed by the recording laser power setting means 1089 of FIG. 6. This process is to be conducted as part of the ordinary write process, after completion of the recording laser power calibrating process of FIG. 14. First, in step S1, the zone number zi is calculated from the track number TRj as the access position. In step S2, the recording laser power Pi of the zone leading track number TRi of the corresponding zone is fetched by referring to the recording laser power storing table 106 (FIG. 7) for zone number Zi.

Subsequently, the recording laser power Pie of the last track number TRie of the zone number Zi is fetched in step S3, the number of tracks between the last track and the leading track (the first track) is obtained in step S4, and in step S5 the recording laser power Pj is calculated by linear interpolation, as in formula (1) recited above.

Next, in step S6, the temperature coefficient Kt is calculated depending on the characteristic curve of FIG. 10 from the apparatus temperature. Subsequently, in step S7, the recording laser power Pj is compensated for by the temperature coefficient Kt. In step S8, the sensitivity shift compensation of the ΔPa data area is added.

In this case, when compensation amount ΔPa of the sensitivity shift is influenced by either the track position or the apparatus temperature, linear interpolation of the track position and the temperature compensation may be performed as in the case of the recording laser power. Thereby, a more accurate recording laser power value can be obtained, and the reliability of high density recording can be improved.

Figure 17B:
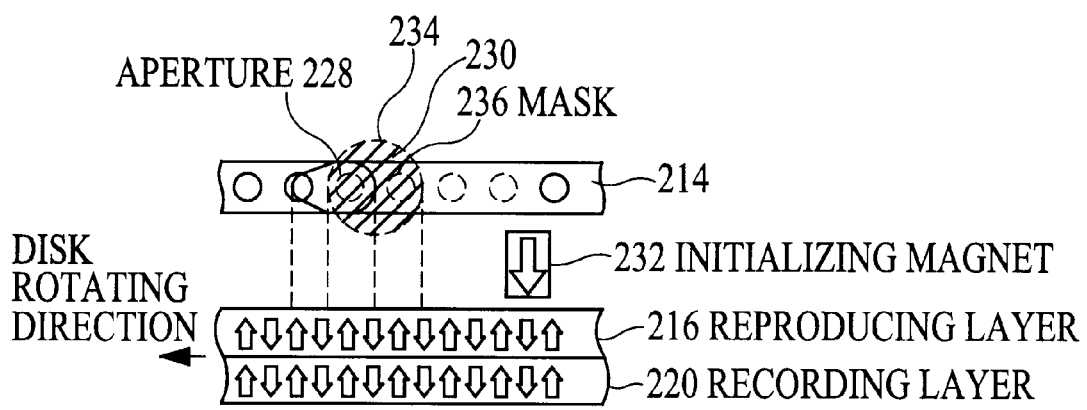
FIG. 17(B) is an explanatory diagram of a reproducing operation of a RAD system.

In step S9, the recording laser power Pj of the compensated data area is output to the recording laser power setting means. The compensating method for calculating the recording laser power of the data track from the recording laser power obtained from the erase process of the test track and the test write of test track have been explained, for example, for the RAD medium of FIGS. 17(A) and 17(B), and it can also be applied to the double mask RAD medium of FIG. 18, as well as to the FAD medium. The medium to which the magnetically induced super resolution technique (MSR) is applied basically has a recording layer and a reproducing layer. However, an extra layer is sometimes provided in various kinds of media.

When the optimum recording laser power shift is generated because of repetition of the erase and write operations, the optimum recording laser power of the data area can be obtained by means of the present invention. Moreover, the present invention can also be applied, by utilizing the function of impressing high power, to a phase change type optical storage media which does not require the magnetic field, in addition to MSR media and magneto-optical storage media.

In the present invention, the information storage area includes the area used for information updates (such as the control area and the data area), but does not include the test area or the power measuring area. Here, a test area may be provided for each zone for conducting the test write, and the test write for obtaining the recording power through approximation is conducted only to the one test area of the zone having a higher application frequency.

In addition, the track and the sector of the user data area may be processed as the data recording area and the power measuring test area. Moreover, the high power process may be executed not only to the test area, but also to the sector and track (FAT area, etc.), which are frequently used in the data area. Particularly, the area of the data area that is used frequently often generates errors in proportion to its frequency of use. Therefore, generation of errors due to the sensitivity shift may be lowered by using the high power process. However, in this case, the optimum power in a frequently used data area is roughly the same as that obtained from the test area by a test write. Thus the optimum power determined from the test write can be used directly, and the sensitivity compensation calculation explained above need not be performed.

As explained above, in the disclosed embodiment, when the optimum recording laser power is changed (i.e., when its sensitivity is shifted) due to repeated erase and write operations upon the medium, the sensitivity shift may be saturated by erasing the medium with a power higher than that required for ordinary operation. Accordingly, the sensitivity shift resulting from ordinary operations can be eliminated or reduced remarkably.

Moreover, since the test track is erased with a power that is higher than that of an ordinary operation, in order to saturate the sensitivity shift of the test track, the sensitivity shift of the test track during ordinary operations can be eliminated or greatly reduced. Therefore, since the sensitivity shift of the test track can be neglected, the recording laser power value of the data track in which the mismatching number of reproduced data bits satisfies the threshold value Nth can be obtained without the need to determine the existence or non-existence of the sensitivity shift of the data track, by adding the sensitivity compensation amount ΔPa to the optimum power obtained by the test write to the test track.

As explained above, according to the present invention, highly reliable recording power can be obtained even when the recording/reproducing operation frequency is different for each area of the optical storage medium.

It has been found that most write errors occur because the optimum write power has not been used. Accordingly, because the present invention enables the controller to better determine the proper write power, the number of write errors will be significantly reduced. Since the number of errors is reduced, the use of the alternate area is also reduced, resulting in less use of the alternate write and retry processes, which ultimately results in an increase in the overall access speed. Namely, the present invention enables highly reliable high density recording to an optical storage medium, and also assures further high density recording.

While various embodiments of the present invention have been shown and described, it should be understood that other modifications, substitutions and alternatives may be apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. An optical storage medium processing method for use with an optical storage medium that is capable of having information repeatedly recorded thereon through the use of an optical beam, the method comprising the steps of:
   performing high power processing upon at least a portion of the medium at an optical beam power that is higher than the optical beam power used for recording, reproducing, or erasing;
   radiating the optical beam upon the portion of the medium that has undergone said high power processing step; and
   calibrating the power of the optical beam to an optimal power based, at least in part, upon information determined from said step of radiating the optical beam upon the portion of the medium that has undergone said high power processing step.

2. The optical storage medium processing method as claimed in claim 1 wherein said high power processing step causes sensitivity shift saturation of the portion of the medium that has undergone said high power processing step.

3. The optical storage medium processing method as claimed in claim 1 wherein said high power processing step is performed only upon a power adjusting area of the medium.

4. The optical storage medium processing method as claimed in claim 1 wherein said high power processing step is performed upon the entire medium.

5. The optical storage medium processing method as claimed in claim 1 wherein said high power processing step is performed with an optical beam power that is approximately at least 20% higher than the optical beam power used for erasing operations.

6. The optical storage medium processing method as claimed in claim 1 wherein said high power processing step is performed upon an optical storage medium that is being rotated at a speed that is lower than that used for ordinary read/write operations.

7. The optical storage medium processing method as claimed in claim 1 wherein the beam power of said high power processing step is controlled so that the temperature of a recording layer of the medium is at a temperature that is higher than its Curie temperature.

8. The optical storage medium processing method as claimed in claim 1 wherein said high power processing step is performed by repeatedly radiating the optical beam upon the medium at a power higher than that used for recording, reproducing, or erasing.

9. The optical storage medium processing method as claimed in claim 1 wherein an off-track detecting function is at least partially disabled during said high power processing step.

10. The optical storage medium processing method as claimed in claim 1 further comprising the step of impressing a high power magnetic field upon the medium to impress a magnetic field within the medium into a predetermined direction.

11. The optical storage medium processing method as claimed in claim 10 wherein a combination of said high power processing step and said high power magnetic field impressing step results in sensitivity shift saturation of the portion of the medium that has undergone said high power processing step and said high power magnetic field impressing step.

12. The optical storage medium processing method as claimed in claim 1 further comprising the step of determining the necessity of performing said step of calibrating the power of the optical beam.

13. The optical storage medium processing method as claimed in claim 12 wherein said necessity determining step determines the necessity of performing said calibrating step based upon the time elapsed from the previous performance of the calibrating step and/or the difference in the temperature of the medium from the previous performance of the calibrating step.

14. The optical storage medium processing method as claimed in claim 1 wherein said step of calibrating the optimal power is performed for each zone of the medium.

15. An optical storage medium processing apparatus for accessing an optical storage medium by radiating thereto an optical beam, comprising:
   an optical head for radiating an optical beam of a predetermined power to a predetermined position of the optical storage medium; and a high power process controller for positioning said optical head to direct the optical beam to a power adjusting area and for controlling the power of the optical beam to be a power that is higher than that used for recording, reproducing, or erasing, to thereby control a high power process in which the high power optical beam is radiated upon said power adjusting area.

16. The optical storage medium processing apparatus as claimed in claim 15, wherein the high power process performed upon the medium is sufficient to cause sensitivity shift saturation of the medium.

17. The optical storage medium processing apparatus as claimed in claim 15, wherein said high power process controller radiates the high power optical beam to said power adjusting area and simultaneously controls impression of a magnetic field upon the medium in order to impress a magnetic field within the medium into a predetermined direction.

18. The optical storage medium processing apparatus as claimed in claim 15, wherein said high power process controller disables, at least partially, an off-track detecting function during high power processing and then fully enables the off-track detecting function during normal operation upon completion of the high power processing.

19. An optical storage medium processing apparatus for accessing an optical storage medium through radiation of an optical beam, comprising:

a power adjustment processor for determining a preliminary optimum recording power to be used for determining an appropriate power for recording information to an information recording area of the optical storage medium, said determination being made by recording to a power adjusting area of the optical storage medium prior to recording said information, wherein said power adjusting area has undergone a high power process which is performed at an optical beam power that is higher than the optical beam power used for recording, reproducing or erasing; and a power processor for obtaining the optimum recording power for the recording of information to the information recording area, said optimum recording power being attained by compensating said preliminary optimum recording power obtained by said power adjustment processor with a predetermined amount of sensitivity compensation.

20. The optical storage medium processing apparatus as claimed in claim 19, wherein said predetermined amount of sensitivity compensation is determined so that the resulting optimum recording power will be within the range of the optimum recording power when sensitivity shift is in a saturated condition, as well as being within the range of the optimum recording power during an initial condition prior to said sensitivity shift.

21. The optical storage medium processing apparatus as claimed in claim 19, wherein the high power process performed upon the medium is sufficient to cause sensitivity shift saturation of the medium.

22. An optical storage medium capable of having information repeatedly recorded thereon by receiving radiation from an optical beam, the medium comprising:

a plurality of zones dividing said medium, wherein each zone has a Curie point; and a heating process area in each of said zones, wherein a heating process, which is performed at an optical beam power that is higher than the optical beam power used for recording, reproducing or erasing, so that the heating process is conducted at a temperature that is higher than the Curie point of the associated zone, has been performed upon each heating process area.

* * * * *